(12) United States Patent
Argiro

(10) Patent No.: US 11,481,079 B2
(45) Date of Patent: *Oct. 25, 2022

(54) ACTIONABLE-OBJECT CONTROLLER AND DATA-ENTRY DEVICE FOR TOUCHSCREEN-BASED ELECTRONICS

(71) Applicant: Chris Argiro, Toronto (CA)

(72) Inventor: Chris Argiro, Toronto (CA)

( * ) Notice: Subject to any disclaimer, the term of this patent is extended or adjusted under 35 U.S.C. 154(b) by 97 days.

This patent is subject to a terminal disclaimer.

(21) Appl. No.: 15/868,470

(22) Filed: Jan. 11, 2018

(65) Prior Publication Data

US 2018/0136738 A1  May 17, 2018

Related U.S. Application Data

(63) Continuation-in-part of application No. 15/196,019, filed on Jun. 28, 2016, now Pat. No. 10,955,920, (Continued)

(51) Int. Cl.
*G09G 5/00* (2006.01)
*G06F 3/044* (2006.01)
(Continued)

(52) U.S. Cl.
CPC .......... *G06F 3/0447* (2019.05); *G06F 1/1626* (2013.01); *G06F 1/1671* (2013.01);
(Continued)

(58) Field of Classification Search
CPC .... G06F 3/016; G06F 3/03547; G06F 3/0488; G06F 3/03543; G06F 2203/014; G06F 3/0416; G06F 3/04886; G06F 3/0414; G06F 2203/04808; G06F 2203/04111; G06F 2203/0384; G06F 3/038; G06F 2203/04104; G06F 3/047; G06F 2203/04108; G06F 1/1669; G06F 2203/0331; G06F 3/014; G06F 3/0224; G06F 3/0236; G06F 3/0238; G06F 3/0441; G06F 3/0442; G06F 3/0482; G06F 3/017; G06F 3/041; G06F 3/04842; G06F 3/04845; G06F 3/165; G06F 3/011;
(Continued)

(56) References Cited

U.S. PATENT DOCUMENTS 8,406,961 B2 * 3/2013 Pathak ............... G06F 3/03547
701/48
2006/0097994 A1 * 5/2006 Miyakoshi ......... G01C 21/3688
345/173

(Continued)

*Primary Examiner* — Duc Q Dinh
(74) *Attorney, Agent, or Firm* — Christopher Pilling

(57) ABSTRACT

Various systems, methods and apparatus are described for actuating a touchscreen user interface. A first exemplification comprises an intermediary-transceiver or mediating device; wherein said device is wirelessly capable of providing a scalable mapping interface to a touchscreen user environment. A second exemplification includes one or more conductive interfaces that are operatively coupled with a touchscreen device using at least one of a wireless interface and a conductive actuator at endpoint. Beyond the first and second exemplification above, other exemplary control modalities are also advanced and embodied by the inventor of the present invention.

23 Claims, 20 Drawing Sheets

Related U.S. Application Data which is a continuation-in-part of application No. 14/862,327, filed on Sep. 23, 2015, now Pat. No. 9,411,467, which is a continuation-in-part of application No. 14/062,824, filed on Oct. 24, 2013, now Pat. No. 9,158,387, which is a continuation of application No. 13/635,836, filed as application No. PCT/IB2011/051049 on Mar. 12, 2011, now Pat. No. 8,599,162, which is a continuation-in-part of application No. 13/005,315, filed on Jan. 12, 2011, now Pat. No. 8,368,662.

(60) Provisional application No. 61/344,158, filed on Jun. 2, 2010, provisional application No. 61/282,692, filed on Mar. 18, 2010.

(51) Int. Cl.
| | | |
|---|---|---|
| *G06F 3/04886* | (2022.01) | |
| *G06F 3/01* | (2006.01) | |
| *G06F 3/02* | (2006.01) | |
| *G06F 3/041* | (2006.01) | |
| *G06F 1/16* | (2006.01) | |
| *G06F 3/039* | (2013.01) | |

(52) U.S. Cl.
CPC ............ *G06F 3/016* (2013.01); *G06F 3/0219* (2013.01); *G06F 3/0393* (2019.05); *G06F 3/041* (2013.01); *G06F 3/04886* (2013.01); *G06F 2203/04809* (2013.01)

(58) Field of Classification Search
CPC ...... G06F 3/048; G06F 3/04895; G06F 9/543; G06F 2203/04809; G06F 3/0393; G06F 1/1626; G06F 1/1671; G06F 3/0219; G06F 3/0227; G06F 3/04162; G06F 3/044; G06F 3/0447; G06F 3/04883; G06F 3/167; G06F 3/0346; G06F 21/305; G06F 3/0412; G06F 3/01; G06F 3/033; A63F 13/213; A63F 13/2145; A63F 13/218; A63F 13/28; A63F 2300/1056; A63F 2300/1075; A63F 13/533; A63F 13/426; A63F 13/92; A63F 13/211; A63F 13/5375; A63F 13/20; A63F 13/235; A63F 13/42; A63F 2300/6045; A63F 13/21; A63F 13/214; A63F 13/23; A63F 13/285; A63F 13/352; A63F 13/52; A63F 2300/308; G07F 17/3209; G07F 17/3225; G07F 17/3204; G07F 17/326; H04N 2201/3278; H04N 1/00204; H04N 1/00381; H04N 2201/3253
USPC ... 345/173–175, 173–181, 1.1–1.3, 156, 169
See application file for complete search history.

(56) References Cited

U.S. PATENT DOCUMENTS

| | | | |
|---|---|---|---|
| 2007/0257821 A1* | 11/2007 | Son | G06F 3/0446 341/22 |
| 2009/0161027 A1* | 6/2009 | Hardacker | H04N 21/472 348/734 |
| 2009/0225036 A1* | 9/2009 | Wright | G06F 3/0443 345/173 |
| 2010/0315348 A1* | 12/2010 | Jellicoe | G06F 1/1632 345/173 |
| 2012/0007808 A1* | 1/2012 | Heatherly | G06F 3/044 345/173 |
| 2012/0282987 A1* | 11/2012 | Romero | A63F 13/245 463/5 |

* cited by examiner

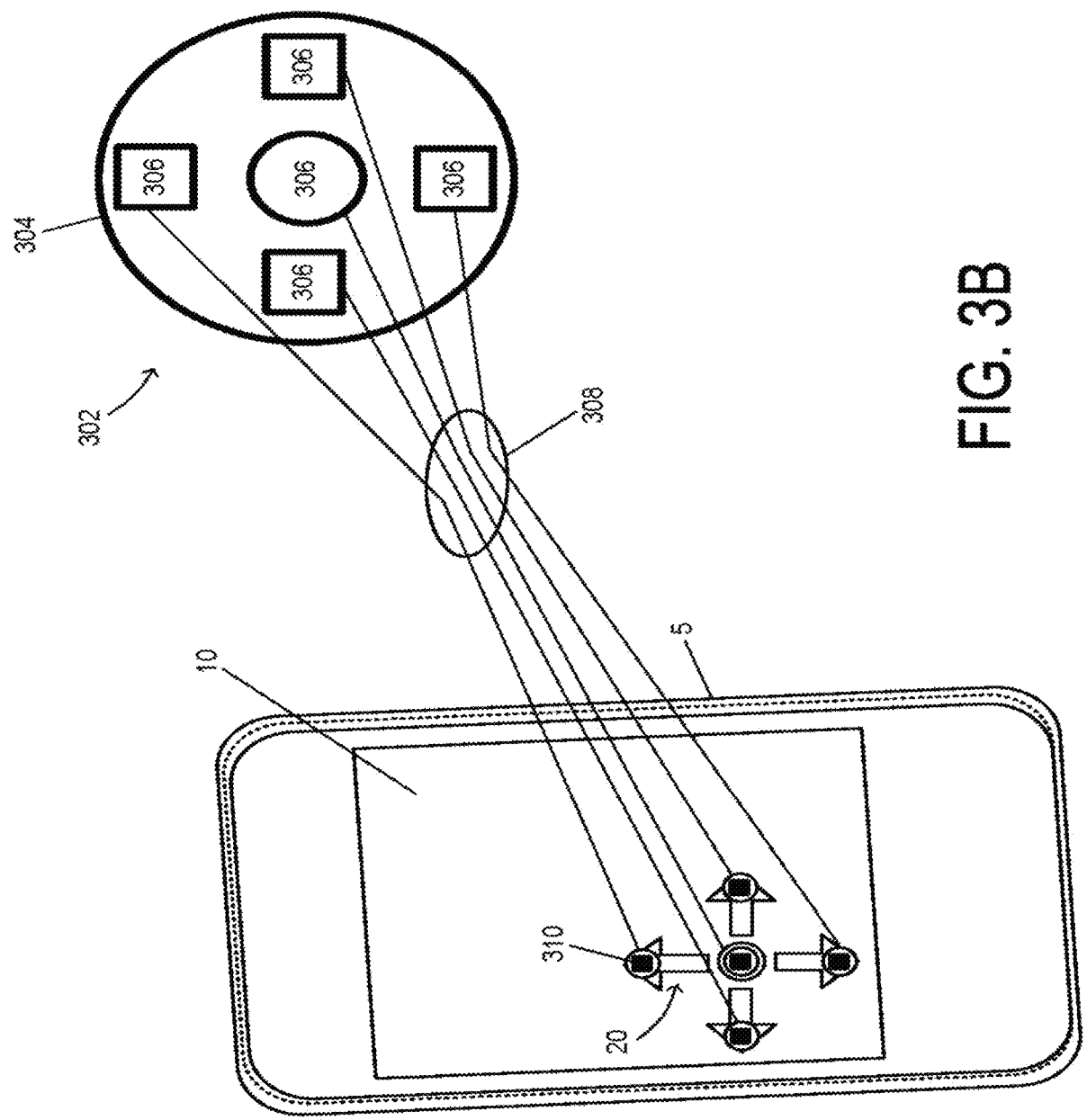

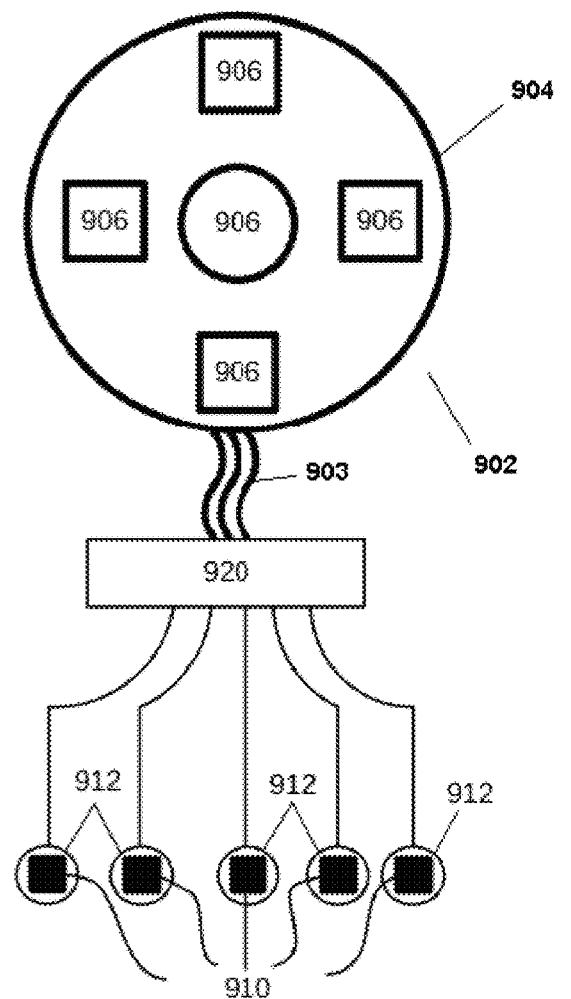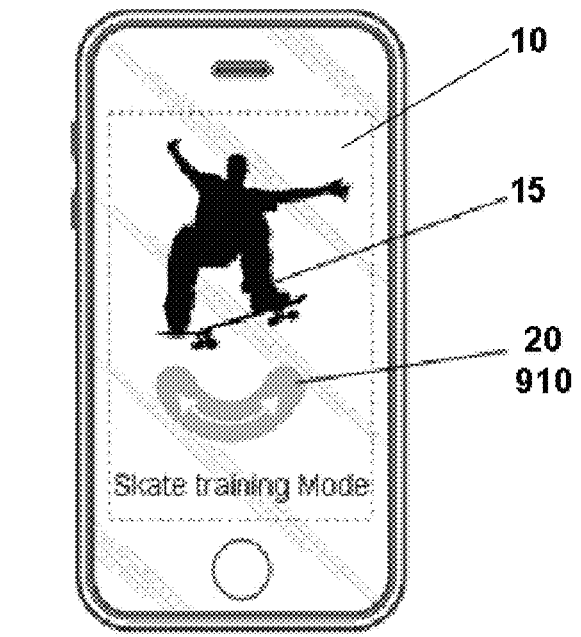
FIG. 9B

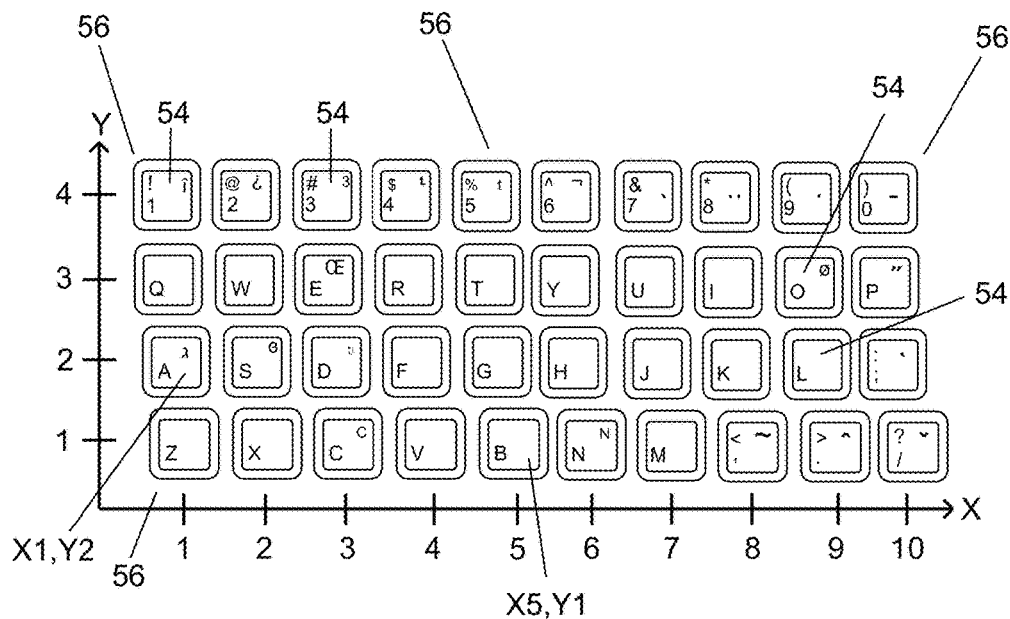
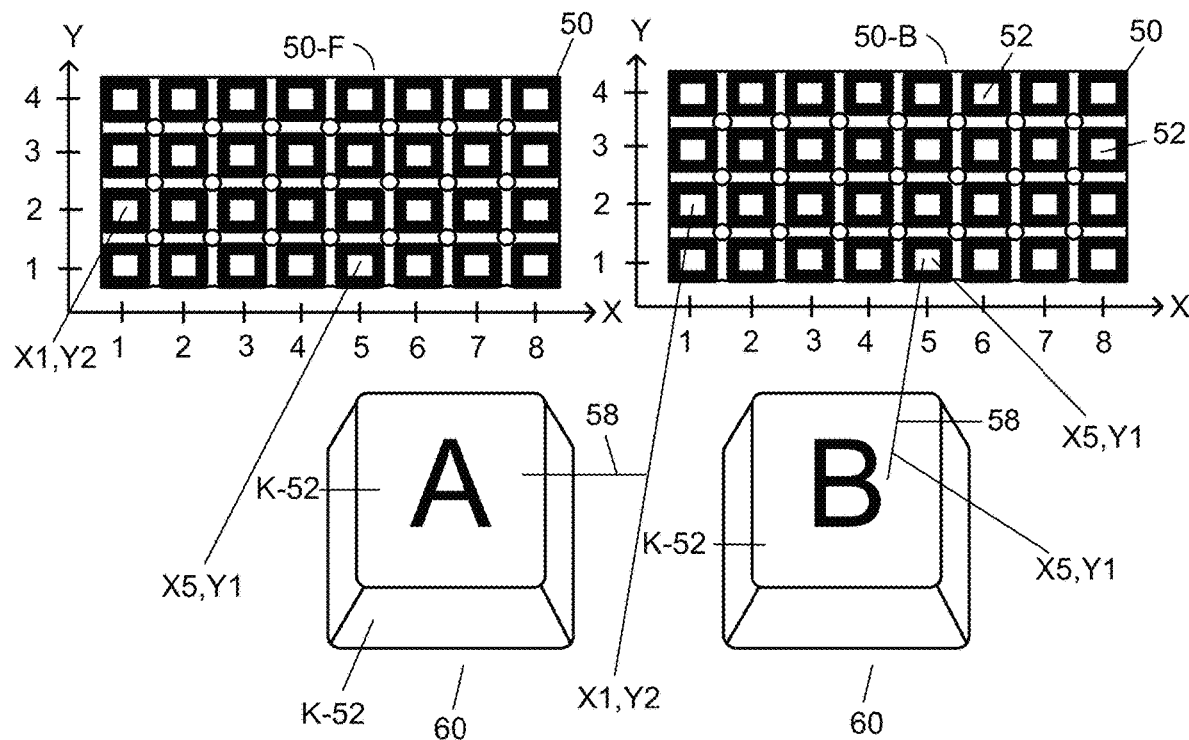
FIG. 13
ACTIONABLE-OBJECT CONTROLLER AND DATA-ENTRY DEVICE FOR TOUCHSCREEN-BASED ELECTRONICS This application claims the benefit under 35 U.S.C. § 119 from at least U.S. Provisional Application Ser. No. 61/282,692, filed on Mar. 18, 2010; U.S. Provisional Application Ser. No. 61/344,158 filed Jun. 2, 2010; U.S. Pat. No. 9,411,467 filed on Sep. 23, 2015; and CIP Application 20160328082, filed by the inventor on Jun. 28, 2016. The disclosures of each of the common-ownership filings cited in this paragraph and those under common ownership cited in the specification body below are incorporated in their entireties herein by reference.

BACKGROUND

The present invention relates to the technical field of touchscreen-based electronics. Touchscreen-based electronics, in both a portable and stationary environment, can include a wide array of devices such as: personal and notebook computers, netbooks, ATMs, POS or information kiosks, ticket-dispensing machines, portable media players, personal digital assistants, monitors, televisions, tablets, branded i-devices and Mobile Internet Devices or MIDs, such as multi-media and Internet-enabled Smart phones; although this list is not intended to be exhaustive.

Touchscreens allow users of these devices to input commands, engage in data entry or otherwise control an actionable object or on-screen graphic through touch—typically by finger, thumb or stylus contact. The touchscreen senses the coordinates of the "touch," through any of the varying means of touchscreen-based technologies, including, but not suggestive of limitation to, those that are capacitive-and-resistive governed. The coordinate data registered via "touch-sensing" can then be relayed to the device's micro-controller (or processor) for related processing and can further see execution by software associated with applications running on the particular device in order to initiate a desired action.

Coordinate-data determination at the point of contact, of course, being technology specific. With resistive touchscreen technologies, for example, the touchscreen panel is comprised of several layers; notably two electrically-conductive membranes that are typically separated by an extremely thin non-conductive gap. When pressure is applied to the flexible topmost layer, contact is made with its conductive pairing, effectively completing "the circuit" at the point of contact and thus, engaging the related hardware for specific coordinate-data determination and related processing.

In a capacitive-sensor system, the touchscreen panel, typically glass coated with a material such as indium tin oxide to enhance conductivity across a sensor device, acts as a sensor. In preamble, a biological property of the human body is its ability to carry and store an electrical charge—a case in reference being the electrons contained in your finger. The capacitive-sensor system utilizes a conductive input, usually a user's finger, to register touch (and is ideally capable of collectively tracking 10 or more fingers concurrently). Finger contact with the capacitive-based touchscreen panel alters the electrostatic field, which is then interpreted by the processor and device's software, such as any pre-installed input-driven software, translating this touch into a gesture or command. Respective capacitive touchscreens feature electrostatic-field monitoring circuitry, with points that can be arranged in the form of a grid. Each point on the grid is designed to register changes in electrostatic fields and process them accordingly, making multi-touch and multi-gestures possible.

Input-driven software may include touch-requisite applications such as those fueling an ever-growing list of smartphone "apps". In associative transition, despite mobile apps being wildly popular, a direct consequence of the pocket-sized footprint of portable gadgets may see a user experience that is greatly attenuated by significant limitations of control of an actionable object or "an on-screen graphic". Contributing factors may include the device's small screen size and tiny on-screen control-keys, the size and sensitivity of the positioning of a user's fingers, the lack of a tactile reference point, the diversity and changing landscape of the soft keys and the unnatural fit for many of controlling or navigating an actionable object whilst the touchscreen-enabled hardware is concurrently grasped. In the ease of gaming applications on portable hardware, where control of an actionable object or player for a particular gaming title becomes more intricate, these limitations of control can be exacerbated.

The imprecise nature of traditional, graphic-based actionable-object control may be especially apparent when console-born gaming titles are adapted to the small screen (pocket gaming), and controllers, control models and/or control efficacy between both platforms can be compared based on a user's experience. Even simple left, right, upward and downward navigation that is engaged by a touch screen's soft buttons or keys, in a traditional manner, may prove difficult to execute in certain environments. Peer-based, business or SMS (Short Message Service) texting and data-entry applications, additionally, can suffer from a tiny-portable footprint, where the "hunt and peck", for example, may not always be as productive as first intended. With one's finger size often bigger than the soft keys or buttons it was designed for, this can lend itself to accidental "key bleed" between neighboring keys—that is, with neighboring keys accidentally being touched in data-entry execution over the intended ones or, similarly, a plurality of keys accidentally being touched concurrently, instead of an intended single-key execution.

Circumstances may generally arise where it would be desirable to operate the soft inputs on the touchscreen device from a distance or using alternate input modalities to a traditional means; in both a portable and stationary (notwithstanding its larger form factor) environment. By way of example, and not limitation, this means potentially designing away from applications in which the user directly touches the display and/or directly handles the device.

SUMMARY

It is to be understood that the following partial summary, detailed description and any of the accompanying subject matter are exemplary and explanatory in nature. Each serving as a descriptive pigment to the invention being claimed. Neither the summary nor the description that follows, nor any of the accompanying subject matter, is intended to define or limit the scope of the invention to the particular aspects and/or features mentioned therefrom.

Embodiments herein are directed to systems, devices and methods for at least expanding and/or performably enhancing control modalities used in the manipulation of soft inputs on a touchscreen device; in both stationary and portable device environments.

In one aspect, one or more manipulable conductive interfaces are operably, mappably and wirelessly coupled to the user interface of at least one linked touchscreen device in order to control one or more of its soft inputs.

In another aspect, one or more manipulable conductive interfaces are operatively coupled with a touchscreen device using a serviceable conductive path and a conductive actuator at endpoint to control one or more of its soft inputs.

According to a further embodiment, an intermediary-transceiver device or member comprising at least one of a transceiver (defined as a radio transmitter-receiver) and wireless unit or module is described. The transceiver configuration at least serving as a mediating agent and configured to wirelessly relay control signals it receives, from an originating input device linked thereto, to a succeedingly linked touchscreen device (e.g. a remote mappable terminus) when controlling its soft-inputs and/or user interface. In a consanguineous disclosure to the parent patent and at least the present embodiment, three transceiver-based control modalities are described in association and comprise an exemplary form.

In an embodiment, a conductive controller may be positioned conterminously, proximately and/or contactually to a touchscreen. The controller can be configured to provide a physical and conductive interface for a soft controller being displayed as, for example, soft keys or buttons on a touchscreen.

Further to this embodiment, the conductive controller may have one or more input ends and one or more linked output ends that service a conductive path and can be operatively coupled to the soft buttons or elements of a touchscreen. Operative coupling in this manner permits a capacitive load to be distributed at least through the output ends and onto the one or more soft inputs when at least the input ends are being manipulated by a user and the output ends are in the actuating position. The output ends may comprise one or more non-abrasive conductive materials, interfaces or elements.

Unlike resistive touchscreens that sense pressure on a touchscreen from an output end regardless of the presence of an electrical signal, traditional capacitive touchscreens are based on electrostatic fields and require a conductive path to remain present between the input and output end for such controller articulations.

In another aspect, an embodiment teaches how varying the contactual alignment of the output ends with the soft-buttons, for instance at the soft-button's outermost edges, allows for physical expansion of the size of the tactile controller from the fixed dimensions of the soft-button controller, which may be coveted in scenarios revolving around a pocket-gaming environment.

In an exemplary remote embodiment, a controller assembly provides for a remote interface to occur between at least one of a physical controller and input interface and a soft controller disposition displayed on a touchscreen display. Remote operation may comprise at least an arm's length spacing between at least one of the user and the controller modality and the touchscreen device being operated by a user. That is, as embodied, an actionable-object and/or soft-input controller is configured to operate remotely from a device created for the control input of a finger or touch—an an action denoting the touchscreen's own namesake. Remote operation is delineated in both wired and wireless expressions.

According to a haptic embodiment, a hand-held controller comprises a vibration motor that is engaged according to directives administered through one or more haptic associations with a broadcast agent (such as a capacitive touchscreen device). Haptic association may be linked with at least one of a transceiver, touchscreen user interface and capacitive load or haptic directives can be interpreted directly by a specially-designed, independent hand-held controller. Both wired and wireless mediums may be utilized in a haptic environment for at least the act of operable coupling.

According to an embodiment, a keyboard, with at least its keys made operably conductive, is operatively coupled with a touchscreen device and provides the user with a physical interface for manipulating one or more remote soft-buttons, soft-keys or soft-inputs. Operative coupling may comprise at least one of a physical contact coupling and a wireless coupling, as an example.

One or more of the described embodiments may use an AV output means configured to connect to a touchscreen device that allows touchscreen device output to be viewed on a television screen, freeing touchscreen device input and/or output from the constraints of the touchscreen device.

In some embodiments, an innate capacitive source and capacitive manager is configured for replacing a user, more particularly, for replacing the user's capacitive load distribution or control input of a finger. The configuration permits soft inputs to be engaged without direct user contact or, similarly, without a direct conductive path being present between input and output ends by drawing from the innate capacitive source in environments thereby disposed. Not suggestive of limitation.

These and other articulations of the present invention falling within its scope are pabulum of the disclosure and its associated drawings. Non-traditional input interfaces for touch-screen based electronics are herein imparted, an impetus at the core of all filings under at least the title: ACTIONABLE-OBJECT CONTROLLER AND DATA-ENTRY ATTACHMENT FOR TOUCHSCREEN-BASED ELECTRONICS.

BRIEF DESCRIPTION OF THE DRAWINGS

The accompanying drawings, which are incorporated herein and form a part of the specification, illustrate exemplary embodiments and, together with the description, can serve to enable a person skilled in the art to make and use these embodiments and others made apparent to those skilled in the art. The invention will be more particularly described in conjunction with the following drawings:

FIG. 3B portrays a controller assembly designed for remote operation; conductively married by attachment to the soft buttons or keys of a touchscreen, according to an embodiment. (See also FIGS. 10A, 10B)

FIG. 9B illustrates a mediating technology configured with a wireless component and is at least purposed for controlling one or more linked touchscreen soft inputs, according to an embodiment.

FIG. 13 is an associative diagram of the touchscreen-controller attachment matrix and its correct attachment sequence to the graphical or touchscreen-based soft buttons or data-entry buttons at the matrix's face 50-F and its integration with the conductive keys (partially illustrated for clarity using only two conductive keys or the actionable letters "A" and "B") of a receptive keyboard, keypad or data-entry device, via extension from the matrix's back, according to an embodiment.

DETAILED DESCRIPTION

Figure 1:
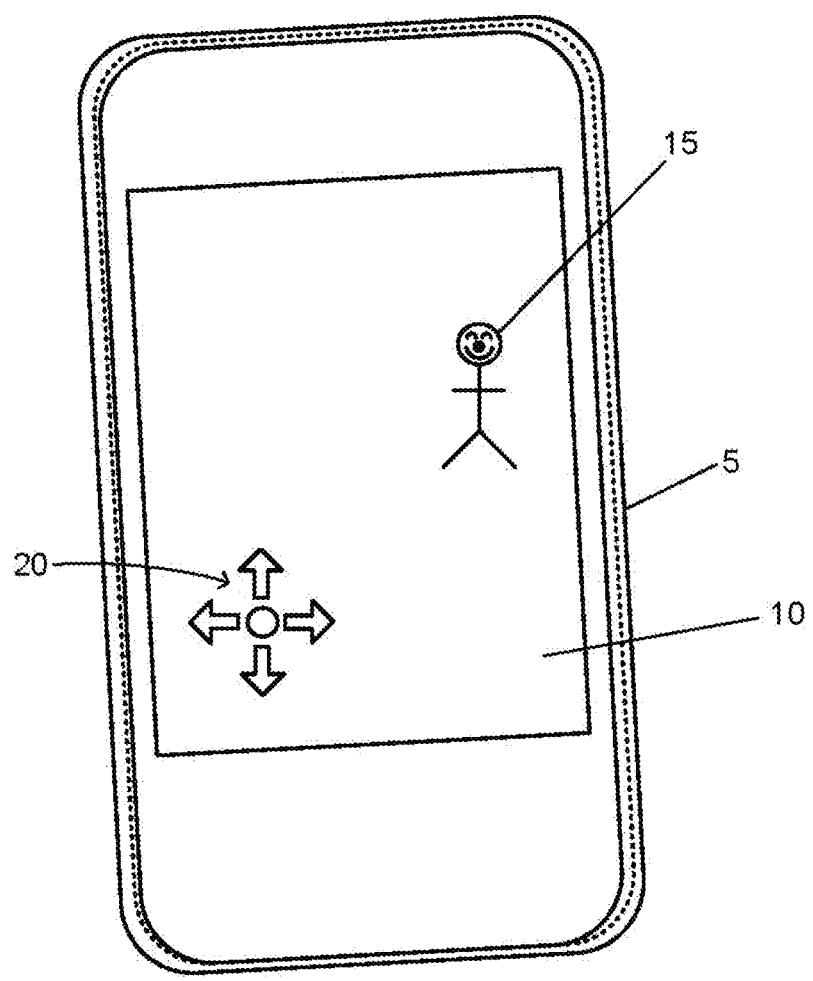
FIG. 1 is a top view of a soft-key or soft-button touchscreen controller (graphically-based) and a controllable or actionable object on a touchscreen, according to prior art.

Embodiments herein are directed to systems, devices and methods for improving input function of soft-button controllers (graphical representations that are engaged by—or respond to—the control input of a finger in order to carry out a function) and/or any respective soft key or keys and/or graphical representations situated on a capacitive touchscreen, particularly; in both stationary and portable devices.

The disclosures herein are provided to lend instance to the operation and methodology of the various embodiments and are neither intended to suggest limitation in breadth or scope nor to suggest limitation to the claims appended hereto. Furthermore, such exemplary embodiments may be applicable to all suitable touchscreen-hardware platforms (tablets, smart phones, monitors, televisions, point-of-display, etceteras) and can also include all suitable touchscreen technologies, beyond capacitive and capacitance governed, such as those inclined with resistive touchscreens that, too, respond to touch input, albeit with its own peculiarities related to the technology. Those skilled in the art will understand and appreciate the actuality of variations, combinations and equivalents of the specific embodiments, methods and examples listed herein.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect said feature, structure, or characteristic in connection with other embodiments whether or not explicitly described.

While a functional element may be illustrated as being located within a particular structure, other locations of the functional element are possible. Further, the description of an embodiment and the orientation and layout of an element in a drawing are for illustrative purposes only and are not suggestive of limitation. Changes, for example, to a defined construction, an operational manner, the platform and/or application environment, etceteras, may be made without departing from the spirit and scope of the titled invention and its parental lineage. It is noted that the diagrams are not to scale.

In the several figures, like reference numerals may be used for like elements having like functions even in different drawings. The embodiments described, and their detailed construction and elements, may be merely provided to assist in a comprehensive understanding of the invention or to assist with understanding general principles of the invention.

Thus, it is apparent that the present invention can be carried out in a variety of ways, and does not require any of the specific features described herein. Also, well-known functions or constructions are not described in detail since they would obscure the invention with unnecessary detail.

In the description that follows, the term "portable device" encompasses portable media players, personal digital assistants, laptop computers, tablets, branded i-devices and multimedia and Internet-enabled smart phones, amongst others similarly situated.

In the description that follows, the term "stationary device" encompasses a device that is generally operated in a fixed location. A stationary device may be movable or transportable, but is generally not operated while in transit.

Whilst embodiments may be illustrated using portable devices, the particularity of these embodiments are not limited to application of portable devices and may instead be applied to stationary devices. For purposes of the discussion that follows, the term "user device" encompasses both portable and stationary devices.

In the discourse that follows, the terms "soft button" or "soft keys" can encompass a graphical representation such as, but not limited to, a D-pad (directional pad) or gamepad, a physical button, a switch, a pointer, an alphanumeric key, data-entry key or any input-seeking graphical representation on a touchscreen; that may be engaged by a user through touch in order to enter a command, indicate a selection, input data or engage or control an actionable object located on the touchscreen. Touch gestures are registered by the touchscreen through interpretation by a processor; in collaboration with the respective software running on the user device.

In the description that follows, the term "attachment" generally refers to a device or assembly that is placed in contact with the soft-buttons on a touchscreen for purposes of engaging control of an actionable object or series of objects, such as those that may be present in gaming, enterprise, office suites, text or data-entry, media, graphics and presentation applications, although these applications are not suggestive of limitation. In certain scenarios, soft-button deployment through attachment contact is not automatic and requires prior manipulation of usually proximal conductive elements for engagement. In other scenarios, the need for attachments is replaced by using a wireless disposition. In further scenarios still, the need for attachment is replaced by a temporary contactual application made by an applicator or application process. An attachment may be adapted for both wired and wireless expressions.

In the description that follows, the term "remote operation" may refer to use of a physical controller assembly, an interface (e.g. a user interface) or device that is intended to be operated at a distance from the touchscreen being controlled. It may also generally refer to any command or input originating from a user or non-user positioned remotely from the touchscreen. It is noted that the term "user input" is not to be inferred as being limited to touch input and may include any input originating from the user.

Embodiments of the present invention are described in more detail below, under dissertation of introduced Figures, with reference to the accompanying drawings.

FIG. 1 illustrates a top view of a soft-key or soft-button controller and an actionable or controllable object on a touchscreen, according to prior art.

A user device 5 utilizes a touchscreen 10. An application running on the user device 5 displays soft buttons 20 that are designed to affect control of an actionable object 15. The actionable object 15 is illustrated as a graphic on the touchscreen 10 and may be a player, character, numerical or alphabetic rendering, cursor, pointer, icon or any other graphical representation that is typically controlled by the rendered soft button inputs 20. In a data-entry sense, the term actionable object 15 can be used interchangeably with the soft-buttons 20 themselves. Such is the case when a soft-button, for instance, comprises an alphanumeric character. In this way, as a soft-button is touch engaged, it can directly translate the gesture into user input in a data-entry application.

As noted previously, due to a user device's 5 potentially small-screen size and concomitant tiny on-screen soft buttons 20, significant limitations of control can be a direct consequence of a small footprint; making precise or intended control of the actionable object 15 difficult in a native, attachmentless state.

Figure 2A:
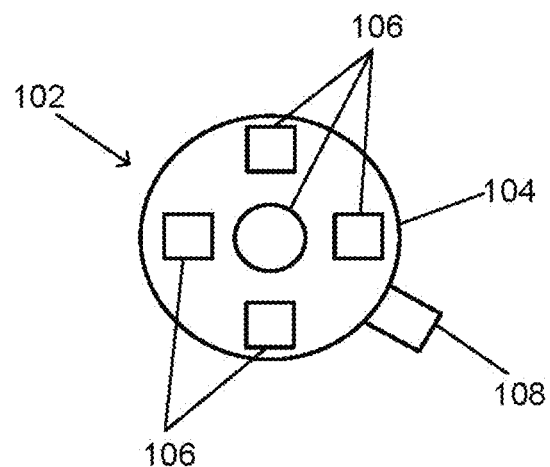
FIG. 2A illustrates a touchscreen-controller attachment, according to an embodiment.
Figure 2B:
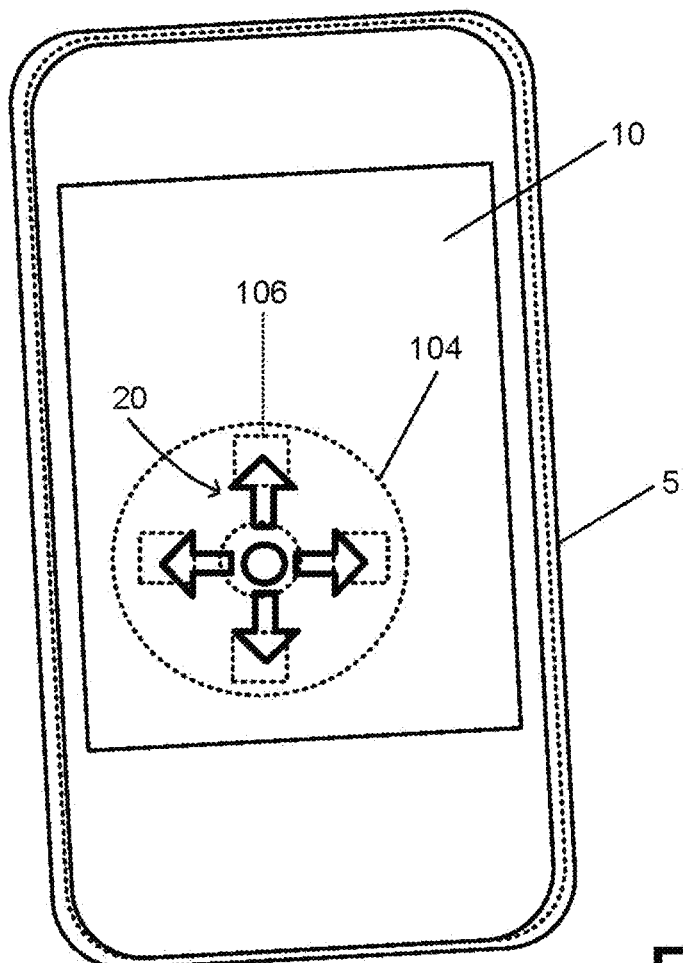
FIG. 2B depicts a touchscreen-controller attachment conductively affixed to the soft keys or soft buttons of a touchscreen, according to an embodiment.

FIG. 2A illustrates a touchscreen-controller attachment 102, according to an embodiment. Other modalities of contactual screen application for the distribution of a conductive path are possible. FIG. 2B illustrates a touchscreen-controller attachment 102 with the respective conductive elements 106 conductively associated to the soft keys 20 or soft buttons 20 of a touchscreen 10, according to an embodiment. Some elements of FIG. 2A may not be reproduced in FIG. 2B since contactual overlay is the elementary focus.

A touchscreen-controller attachment 102 as depicted may comprise an attachment base 104 containing a conductive element 106 or plurality of conductive elements 106. The conductive elements 106 may be made of any electrically-conductive material or materials, including but not limited to, conductive polymers such as polyaniline, conductive gels, conductive liquids, conductive wire, any material that is conductively (exhibiting conductivity) coated—such as with the use of treated and/or dipped foam, thread, or fibers—used alone, in filler compositions or in a series of conductive combinations, as aptly conjoined. The material of the conductive elements 106 are preferably chosen and/or shielded to be non-abrasive to the touchscreen 10.

Excluding the housed conductive elements 106, the touchscreen-controller attachment 102 may be comprised of a non-conductive material or materials, such as plastic or rubber. The back, screen or "attachment" side of the touchscreen-controller attachment 102 according to this figure is designed to contact the touchscreen 10, with the touchscreen-controller attachment's 102 opposing face, (the actuating or "user" side) accessible by a user of the user device 5. The conductive elements 106 are designed for contact with the soft buttons 20 (see FIG. 1 and FIG. 2B) from the attachment side and see the element's conductive path extended, respectively, to an accessible position of touch input on the actuating or "user" side of the user device 5.

The attachment base 104 may be affixed to the touchscreen 10 by suction, static, removable adhesive backing or any other appropriate means. A removal tab 108 provides for removal of the attachment base 104 from the touchscreen 10.

As illustrated in FIG. 2B, the embodied touchscreen-controller attachment 102 is communicatively applied in such a manner that the conductive elements 106 are in contactual and respective alignment with the soft buttons 20 displayed on the touchscreen 10. This alignment permits the capacitive load or capacitance stored, for example, in the user's finger (which is also an electrical conductor) to be conveyed through the conductive elements 106 upon touch at the "input" end and thus alter the amount of charge at the corresponding "output" end seeing touchscreen 10 contact, just as if the user was directly touching the soft-buttons 20 of a touchscreen 10 by the instrumentality of finger or touch input. Said contact may then be interpreted by both the processor and software of the device and relayed, accordingly, to engage control of an actionable object 15. A conductive path thus "extends" the soft buttons 20 of the touchscreen 10 to the entirety of the conductive elements 106. In this way, the touchscreen-controller attachment 102 can offer the user a vastly improved, more refined means of controlling a controllable or actionable object 15 over its "native", attachmentless state.

In contrast with direct finger contact with the soft buttons 20, the touchscreen-controller attachment 102 provides for a physical interface—that can be scalable—assisting the user in tactile reference of a touchscreen's 10 "button geography". Such tactile reference could prove quite advantageous in yielding more precise control, comfort, convenience and a greater parallel to familiarity of habit with an interface that may borrow certain physical expression or expressions from traditional control structures of video-game consoles, amongst other advantages. The touchscreen-controller attachment 102, to elaborate in a tactile sense, provides a physical reference point that reduces a user's need for visual confirmation of the location of the soft buttons 20. With traditional, standalone soft-button controllers in action, as a case in point, visual confirmation may be required when a user's finger has slipped from the soft buttons 20 or fails to actuate a soft-button through misplacement and a loss in finger orientation ensues. In an active gaming environment, for example, with dynamic and rapidly-evolving control schemes facing the user, such miscues can be all too common and to the detriment of the user experience.

The touchscreen-controller attachment 102 is sufficiently wide and long to ensure that the soft-buttons 20 are aligned with the conductive elements 106, but not overly wide and long to otherwise block or encroach germane domain of the actual screen as an application or actionable element is being rendered. Graphical encroachment beyond the soft-buttons 20 may occur, when such encroachment is not deemed critically invasive to the application. The conductive elements 106 may be proportionate to the soft buttons 20 on the touchscreen 10 and also the respective hardware and soft-input ensemble on which it is intended to operate on.

While a single touchscreen-controller attachment 102 is illustrated in FIG. 2B, this is not suggestive of quantitative limitation. In an embodiment, a plurality of touchscreen-controller attachments of varying sizes, shapes, configurations and component dimensions may be simultaneously affixed to a touchscreen 10, in the spirit and scope of this discourse, should control scenarios of an actionable object 15 or objects require it. As the present invention teaches control interfaces beyond those that are attachably disposed, as with FIGS. 9A & 9B, for example, a user may elect to use a different control modality than that by attachment for soft-input manipulation.

Figure 3A:
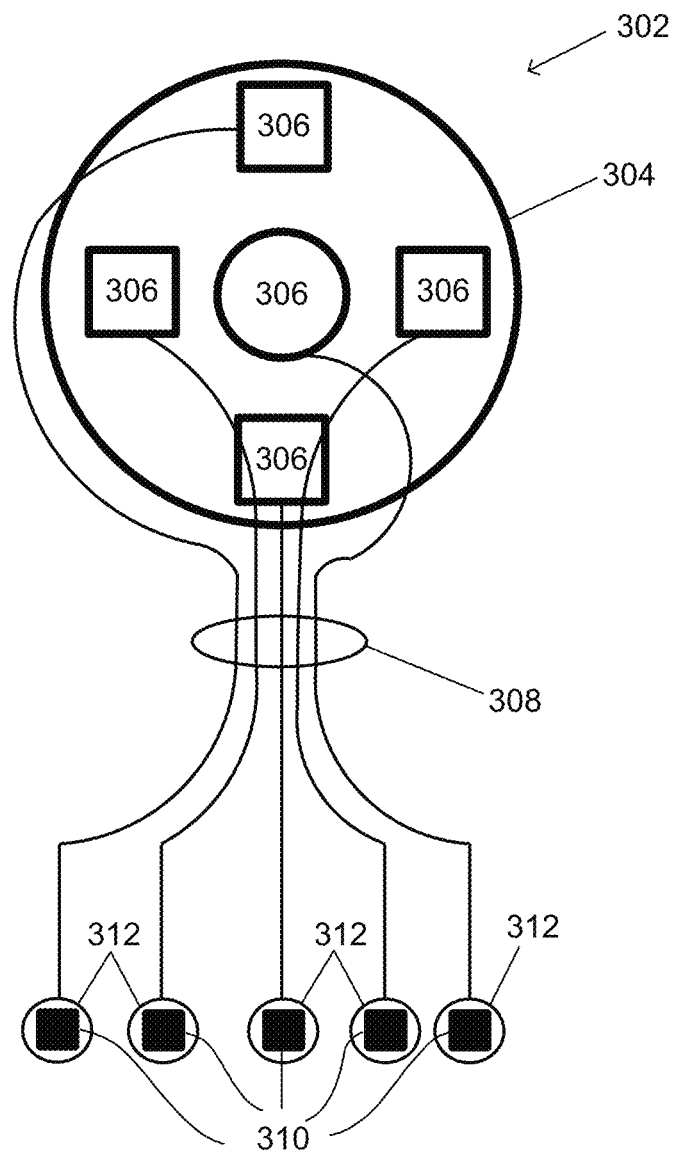
FIG. 3A represents an unattached controller assembly, designed for remote operation, according to an embodiment.

FIG. 3A illustrates an unattached touchscreen-controller assembly, designed for remote operation, according to an embodiment.

A remote actionable-object controller assembly 302 comprises a remote actionable-object controller interface 304, connecting cable 308 and a plurality of conductive elements 310 and 306; each of the conductive elements 310 is individually attached, ensuring a chain-of-conductivity or conductive path remains present, to a conductive extension such as, but not limited to, a wire filament. The connecting cable 308 collectively houses the attached wire filaments for each of the conductive elements 310, with care to ensure each individual wire is properly insulated from each other to prevent conductive "bleed-through" between the competing filaments (subject to contact) housed in the connecting cable 308.

Reciprocally, each of the conductive elements 306 in the remote actionable-object controller interface 304, is individually attached, ensuring a conductive path remains present, to the opposite end of the respective wire filament originally extended from a conductive element 310 and described above. Thus, a conductive path remains throughout the respectively tethered conductive elements 306 and 310 via a wire filament connection.

The conductive elements 306 and 310 may be made of any electrically-conductive material or combination of conductive materials, including but not limited to, conducting polymers such as polyaniline, conductive gels, conductive liquids, conductive inks, conductive wire and/or any material that is conductively (exhibiting conductivity) dipped and/or coated—such as with the use of treated foam, thread, or fibers—used alone, in filler compositions or in a series of conductive combinations, as aptly conjoined to ensure a proper conductive path remains present. Excluding the housed conductive elements 306, the remote actionable-object controller interface 304 may be constructed of a non-conductive material, such as plastic or rubber.

A substantial length of each wire filament remains housed in the connecting cable 308; the exception being the attachable ends of a wire filament, thus helping promote attachment and attachment flexibility. The conductive element 310 is married to the contact base 312 by any means appropriate, with care to ensure a proper conductive path to the touchscreen 10 remains throughout. The contact base 312, containing either a conductive component or constructed from a conductive material in its entirety, is designed to sit conductively affixed to the soft buttons 20 (not illustrated).

FIG. 3B illustrates the touchscreen-controller assembly 302 outlined in FIG. 3A, delineating how it is conductively married—by contactual application—to the respective soft buttons 20 of a touchscreen 10; thus permitting a type of remote operation, according to an embodiment. Variations consistent with its teachings will, of course, exist.

Each conductive element 306 of the remote actionable-object controller interface 304 is assigned to a correlative soft button 20. For instance, according to position, the top conductive element 306 on the remote actionable-object controller interface 304, will see the conductive path completed when it is positioned in contact with the top soft button 20. The conductive element corresponding to the right-most conductive element 306 sees its conductive path extended to the right-most soft button 20, and so on, until each respective soft button 20 is properly accounted for and properly synchronized for intended navigation.

Each conductive element 310 is proportionate to the touchscreen 10 environment in which it is intended to operate. Each conductive element 318 is sized with care to ensure each does not block or encroach germane domain of the actual screen as the application is being rendered and/or unintentionally overlap a plurality of soft buttons 20, upon application to its correlative counterpart. One or more of the conductive elements 310 (e.g. including all attachment housing) may be transparent or translucent, minimizing any loss of view due to placement of the conductive elements. Colour coding may be used to simplify deployment of the controller assembly, amongst other means.

Citing an example of a capacitive touchscreen 10, two electrically conductive objects, in this case a user's finger and the metal electrodes underneath the surface of a capacitive touchscreen, are brought in close proximity—without actually touching. When a user's finger contacts the glass of a specially-equipped touchscreen 10, a tiny instance of capacitance is created between these two electrically conductive objects. This instance of capacitance is cooperatively interpreted by both the processor and software running on the user device 5, thereby translating this touch into directives; such as when attempting control of an actionable object 15. Touching the conductive elements 306 of the remote actionable-object controller interface 304, is detected by the touchscreen 10 in the same way as directly touching the soft buttons 20 on the touchscreen 10 itself, making remote operation from a capacitive-touchscreen device possible through extension of any requisite conductive path(s).

Although not illustrated, the remote actionable-object controller assembly 302 can comprise a current-boosting device that is designed to, for example, intercept, then boost the induced capacitance engaged by finger contact with the conductive elements 306, before it is relayed to the touchscreen 10 in order to complete the conductive path. Such use of an amplifier device may be necessary under certain remote-operating scenarios.

Furthermore, a haptic embodiment marrying an adapted remote actionable-object controller interface 304 with an actuator, such as a single or series of vibratory motors and a vibration-coupling device, forms an exemplary haptic controller—also not illustrated. The haptic controller provides force or tactile feedback to a user, commonly in the form of a vibration reflex to touch. Vibration-feedback may be dependent on governing software, such as with the game play or activity of compatible-gaming titles relaying haptic directives from the user device 5 to the haptic controller. In a game environment, for example, force feedback can be used to register events like bumps, crashes and player damage. A vibration-coupling device acts as an intermediary relay to the vibratory motors of a haptic controller, after first receiving "haptic" or signal directives from the user device 5, in one haptic embodiment, or alternatively, a separate intermediary-transceiver device (See FIGS. 9A, 9B for related discussion) may act as the synchronizing relay agent of haptic directives from a user device 5 to a haptic controller.

Components involved in the relay of haptic directives can be suitably equipped for a full wireless complement, although this does not preclude use of a "wired" constituent and/or substitute. For instance, a haptic controller with innate conductive elements 306 designed to capacitively engage control of an actionable object 15, in the spirit and scope of this discourse, can see a conductive path to a touchscreen 5 completed through use of a wire filament.

Haptic directives may also be communicated using near-field communications (NFC) with, for example, a NFC-equipped mountable intermediary-transceiver device (not shown here, please refer to FIGS. 9A, 9B for related discussion) designed to station—and haptically-interact with—a user device 5. The use of NFC in this embodiment is, of course, not suggestive of limitation to this particular example.

The haptic controller may be powered by a controller battery or plurality of batteries, a power receptacle and/or any other suitable power source. Dimensions according to this embodiment are proportionate in size to the hardware in which it is linked. Although haptic feedback seeks to take advantage of a user's sense of touch, this embodiment is not suggestive of limitation and may be modified to wholly embrace the future of all sensory-involvement devices, including those beyond the sense of touch. Modifications to this embodiment will also occur as haptic technology evolves and a new wave of highly-sophisticated haptic interfaces surface, such as with the possible inclusions of haptic radar, haptic teleoperation, force-feedback RFID and virtual drums and with the evolution of nano-technology interfaces.

The conductive elements 106 illustrated in FIGS. 2A and 2B and as elements 306 and 310 in FIGS. 3A and 3B, and throughout this discourse, may be formed from an absorbent material, shaped to a desired dimension, which is then dipped in a conductive liquid, such as water or a saline solution and packaged in an airtight container (sometimes referred to herein as a "cocoon"). Said container may be fabricated from a thin, flexible plastic material to prevent evaporation of the electrical conductor. The plastic used in this "cocoon" is sufficiently thin to ensure a conductive path remains amongst the conductive elements 106, 306, 310 and the respective soft buttons 20 upon application. The absorbent material selected for the conductive elements 106, 306, 310 may be soft and compressible in nature, as to simulate the feel and physical expression of "button-pressing" of larger, console-based game controllers. The cocoon may also be filled exclusively with a conducting liquid, amongst a broad scope of alternative interfaces and/or deployments, to aptly fulfill the requirement(s) of a conductive path.

Figure 4A:
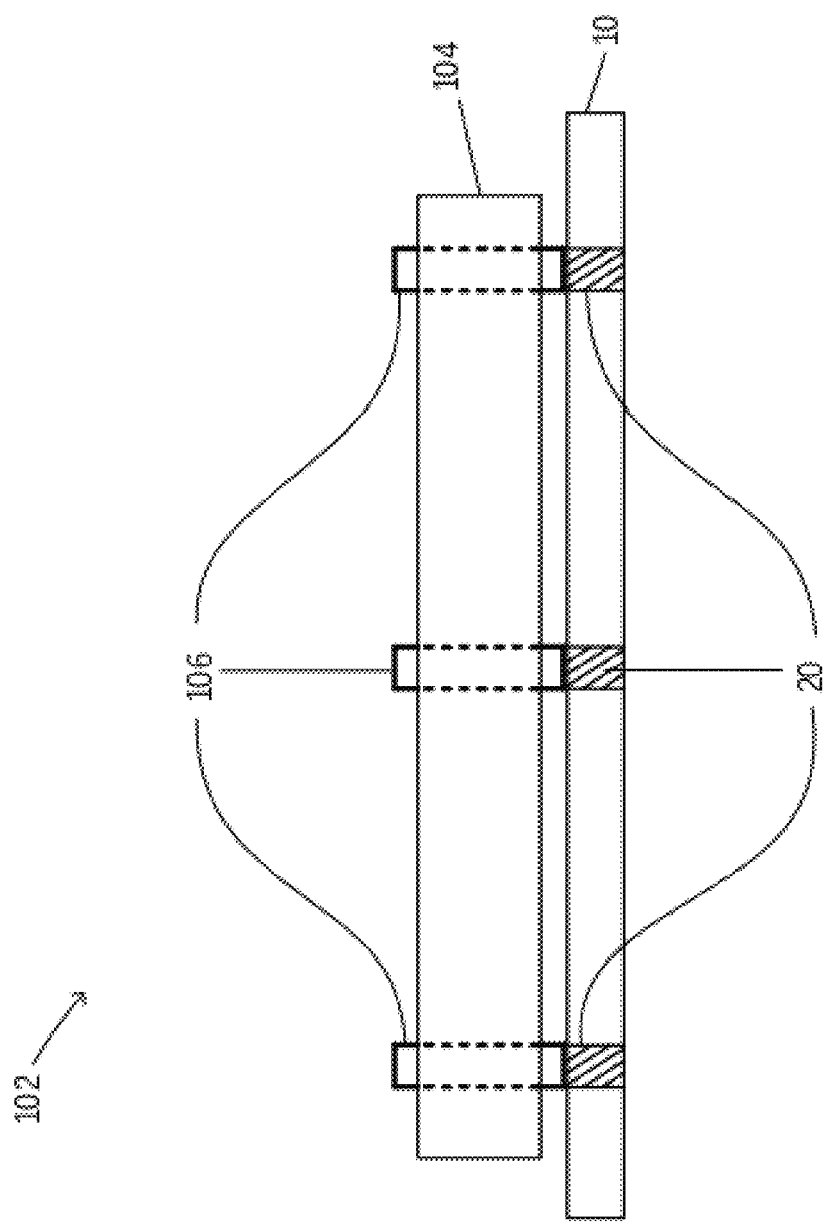
FIG. 4A illustrates a simplified, cross-sectioned side view of an attachable-controller assembly, as affixed, respectively, to the touchscreen, with the correlative conductive elements in constant contact with the touchscreen, according to an embodiment.

FIG. 4A illustrates a simplified, cross-sectioned side view of certain components of a touchscreen-controller attachment 102 (See FIGS. 2A, 2B and related discussions), as affixed, respectively, to the touchscreen 10; with the conductive-elements 106 sitting in a position of constant contact with the touchscreen 10 and the correlative soft navigator buttons 20, according to an embodiment. To engage control functionality a person must simply touch the conductive elements 106 using the control input of a finger.

Figure 4B:
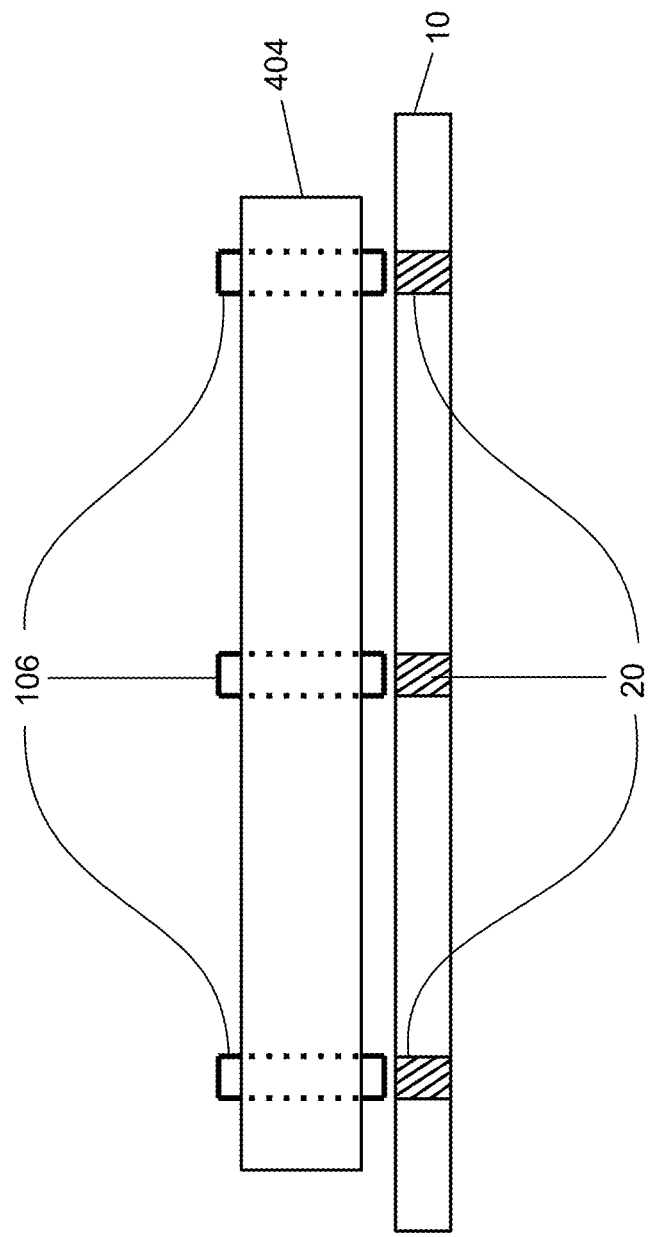
FIG. 4B depicts a simplified, cross-sectioned side view of an attachable-controller assembly, as affixed, respectively, to the touchscreen, with the correlative conductive elements disengaged from the touchscreen at rest, according to an embodiment.

FIG. 4B illustrates a simplified, cross-sectioned side view of certain components of a converse implementation of a touchscreen-controller attachment 102 (See FIG. 4A), as affixed, respectively, to the touchscreen 10. In contrast to FIG. 4A, particularly, the correlative conductive elements 106 are disengaged from the touchscreen 10 at rest, according to this embodiment. To engage control functionality of a capacitive touchscreen under this system, the user employs the control input of a finger or thumb to both touch and concurrently depress the conductive elements 106 until the bottom surface of the conductive elements 106 make contact with the touch-sensitive soft buttons 20. The amount of pressure that is required to actuate the conductive element 106 to a state of contact with the touchscreen 10 can depend on the flexibility of the attachment base 404 and the distance between a conductive element 106 at rest and the touchscreen 10, among other factors. Once finger pressure is removed from the conductive element 106, the conductive element 106 will ideally revert back to its original position of rest (in non-contact mode). A spring-mounted conductive element can also be implemented for such reversion. (See FIG. 5)

This resulting range of motion helps more closely simulate the "button behavior" of buttons found on traditional game controllers, game pads and/or other such control or navigation devices of gaming consoles. Aside from migration to more "button-like" action, this system may help prevent unintentional "button bleed" that can arise from such scenarios as slippage and/or incidental finger contact with competing conductive elements 106, since the user must not only contact, but also depress the conductive elements 106 to a degree of touchscreen 10 contact to be engaged. This design, for instance, may prove useful for soft-button 20 controller renderings where spacing between the set of independent buttons is diminutive and thus, prone to "button bleed".

The conductive elements 106 are preferably proportionate in size to the hardware in which it is intended to operate on and care is directed to ensure dimensions of the conductive elements 106 are not excessive. Overly long conductive elements 106, for instance, can help create undue stress or pressure on the naturally fragile-touchscreen 10 glass when firm, downward finger pressure is being applied by the user. To help safeguard the touchscreen 10, a range-restrictive shield that surrounds the protruding conductive elements 106 at the position of user input, among other means, can be used. This range-restrictive shield is a physical barrier that prevents the conductive elements 106 from pressing too hard against the surface of touchscreen 10 and damaging it, and may be similar to a backstop 14 shown in FIG. 5.

Figure 5:
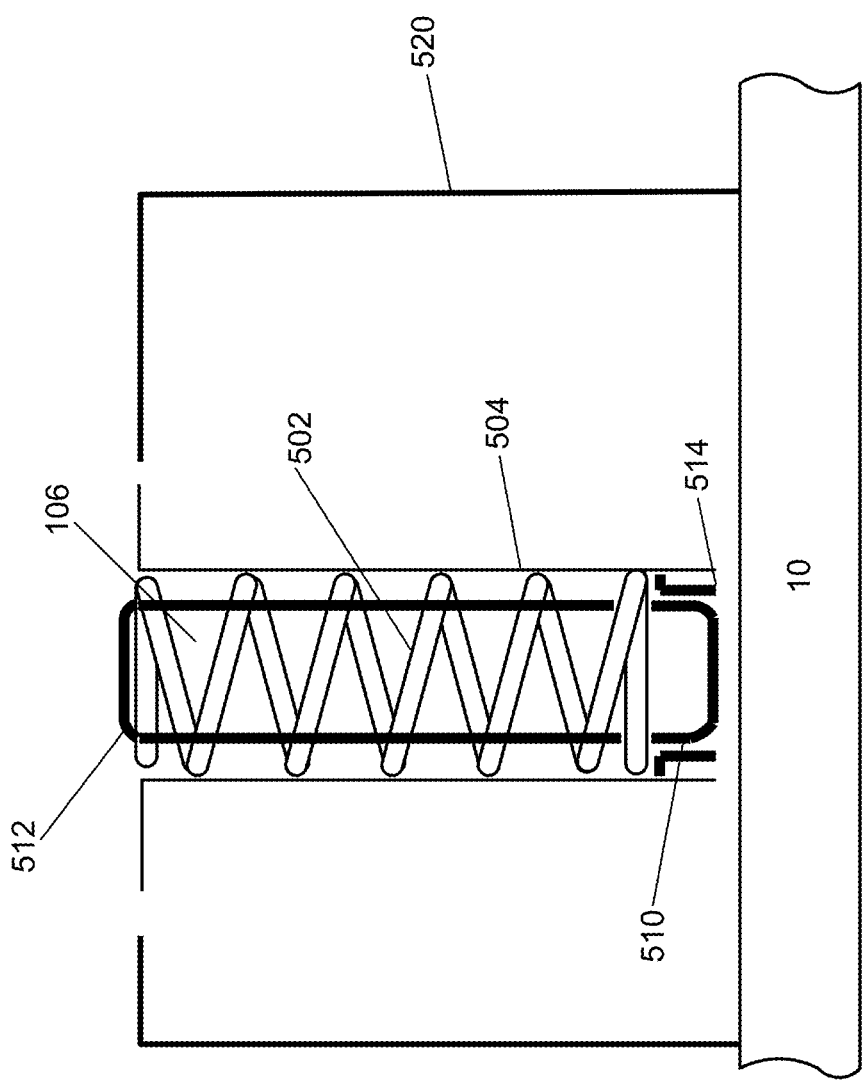
FIG. 5 illustrates a cross-sectional view of a touchscreen-controller attachment, with a single, spring-mounted conductive element, according to an embodiment.

FIG. 5 illustrates a cross-sectional view of a touchscreen-controller attachment, featuring a single, spring-mounted conductive element, according to an embodiment. A cylindrically-tethered compression spring 502 resides in a spring chamber 504 located in the attachment base 520. The cylindrically-tethered compression spring 502 can embrace a substantial length of the conductive elements 106, with a measured allotment of the top and bottom regions of the conductive elements 106 sitting free from the coil wrap of the compression spring 502. The design impetus being to permit fluency of motion for the bottom region 510 of the conductive element 106 in making contact with the touchscreen 10—when the upper region 512 of the conductive element 106 is both touched and concurrently depressed—without risk of harming the surface of the touchscreen 10 from coil abrasion. Accordingly, the cylindrically-tethered compression spring 502 returns to its original position of rest (non-contactual mode of the conductive elements 106) when the downward pressure is removed.

The compression spring 502 is secured by a backstop 514 near the bottom of a spring chamber 504. The backstop 514 may be a circular lip that extends slightly beyond the circumference of the spring for proper anchoring and is not excessively wide that it interferes with the fluency of movement of the conductive element 106 as it is engaged. The conductive element 106 may be of varying heights and dimensions; the determinants of which can be dictated by criteria such as the size and orientation of the touchscreen-controller attachment 10, touchscreen 10 and soft buttons 20. The diameter of the upper region 512 of the conductive element 106 protruding beyond the coil wrap, may be fashioned wider (not illustrated) than the portion that passes through the compression spring 502, if covered, for improved comfort and contact with the tip of a finger or thumb.

Figure 6:
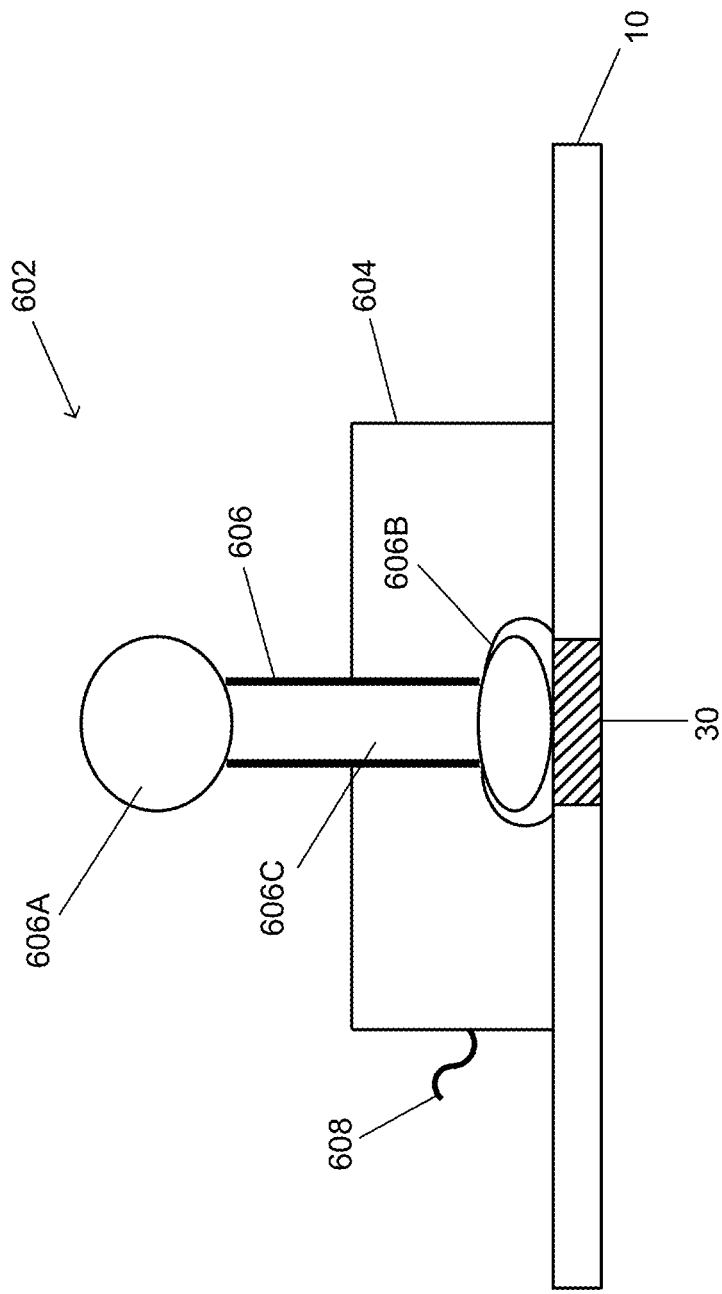
FIG. 6 portrays a touchscreen-controller attachment, borrowing in expression from a traditional joystick controller, primarily through its shaft design and curvilineal conductive top, according to an embodiment.

FIG. 6 illustrates a touchscreen-controller attachment 602, borrowing in certain characteristic expressions from a traditional joystick controller, such as through its shaft design, motion behavior and graspable tip (in this case a curvilinear conductive top mimics the physical expression found on some traditional joystick controllers, although this language is not intended to be limiting), this according to an embodiment. The soft button or buttons 20 (FIG. 1) are represented as a "soft orb" 30 and control of an actionable object 15 (FIG. 1) or player is effected by dragging the soft orb 30 in a 360 degree range of motion. A conductive element is fashioned into a stick controller 606 comprising a top portion 606A, center portion 606C and bottom portion 606B. The top portion 606A may take the shape of a knob, amongst other designs, to furnish grip comfort or remain "knobless", while the bottom portion 606B acts as an actuating base designed to maintain constant contact with the soft orb 30—displayed on the touchscreen 10—during a full range of motions. The center portion 606C represents the shaft and may exhibit a diameter less than that of the corresponding knob or base. The bottom portion 606B may be any of a number of different shapes, for example: a straight shaft with no bulge or a spheroid design or other bulge.

As understood by those skilled in the art, a joystick controller attachment in the spirit and scope of this embodiment may require appropriate electronic translation of movement; since stick-controller gestures can translate to the soft orb 30 on a touchscreen 10 in a reverse manner to those gestured. Anticipatory software can quarterback this "electronic translation" and can be programmed to work in collaboration with such controllers at the source, such as with the game developers. Where complimentary software is not situated, design modifications can be implemented (not shown) to include gesture-reversing components innate to the controller. The impetus of any joystick-configuration measure is to effect appropriate actuation to all desired movements, whereas an "upward" movement of the joystick, for instance, will result in an "upward" or reciprocal movement of a controllable or actionable object 15 on a user device 5.

The conductive stick-controller element 606 is housed in an attachment base 604, which facilitates the conductive stick-controller element's 606 directional and rotational movements and acts to simulate the "feel" of a traditional stick controller by controlling both stabilization and gesture fluency. The attachment base 604 may be affixed to the touchscreen 10 by suction, static, removable adhesive backing or any other appropriate means. A removal tab 608 provides for removal of the attachment base 604 from the touchscreen 10.

Figure 7:
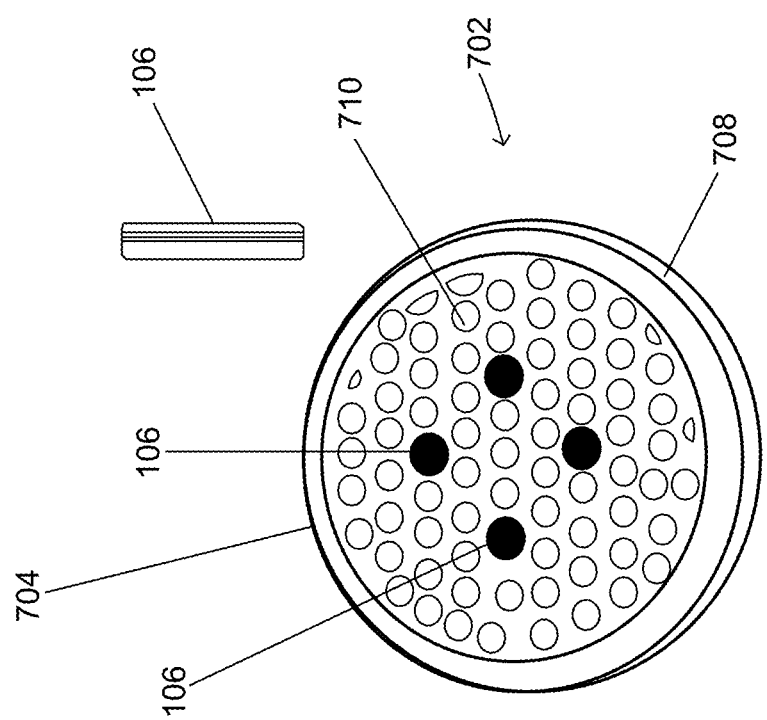
FIG. 7 is a drawing that features a customizable navigation-control system, according to an embodiment.

FIG. 7 illustrates yet another embodiment of a touchscreen-controller attachment 702, featuring a customizable navigation-control system. A touchscreen-controller attachment 702 comprises an attachment or controller base 704. The attachment base 704 comprises a plurality of channels 710 for receiving conductive elements 106. The touchscreen-controller attachment 702 may be oriented on the surface of the touchscreen 10 prior to attachment, such that a congruous plurality of channels 710 align with the totality of the soft buttons 20 (FIG. 1) displayed on the touchscreen 10. Upon attachment, a conductive element 106 is inserted into a channel or channels 710 aligned with the soft buttons 20 (FIG. 1) to a point of conductive contact, thereby causing the soft buttons 20 (FIG. 1) to be actionable from a customizable physical interface that sits attached to the touchscreen 10. Ergo, a transposable configuration apropos to the specific needs of the displayed controller geography is present. This may make possible the use of a single, comprehensive touchscreen-controller attachment 702 per software event without the need for a prefabricated set or plurality of stand-alone, touchscreen-controller attachments (each potentially with widely varying placement of its conductive elements 106) that may be required by a user, for example, with a library of gaming titles. Such configuration virtue may lead to a more ubiquitous attachment.

By way of illustration and not by way of limitation, the highly-configurable attachment base 704 may be implemented as a circular disc, containing a plurality of channels 710 that are arranged in a gridded fashion across the attachment base 704. The attachment base 704 may be circumscribed by a flexible ring 708. The flexible ring 708 may contain a lower lip exterior that may be affixed through suction, static, removable adhesive backing or any appropriate means to the touchscreen 10 (FIG. 1, reference 10) allowing each channel 710 and its respective inserted conductive element 106 to oscillate through directional finger, thumb or individual touch contact; thus adding further flexibility and customization capabilities to the embodiment's control disposition. In other words, each channel and respective conductive element 106 has some flexibility of movement, such that it can be gestured some small translational distance in any direction in order to best match up with the touchscreen 10 and the control disposition of its soft navigational buttons 20, where necessary.

Figure 8A:
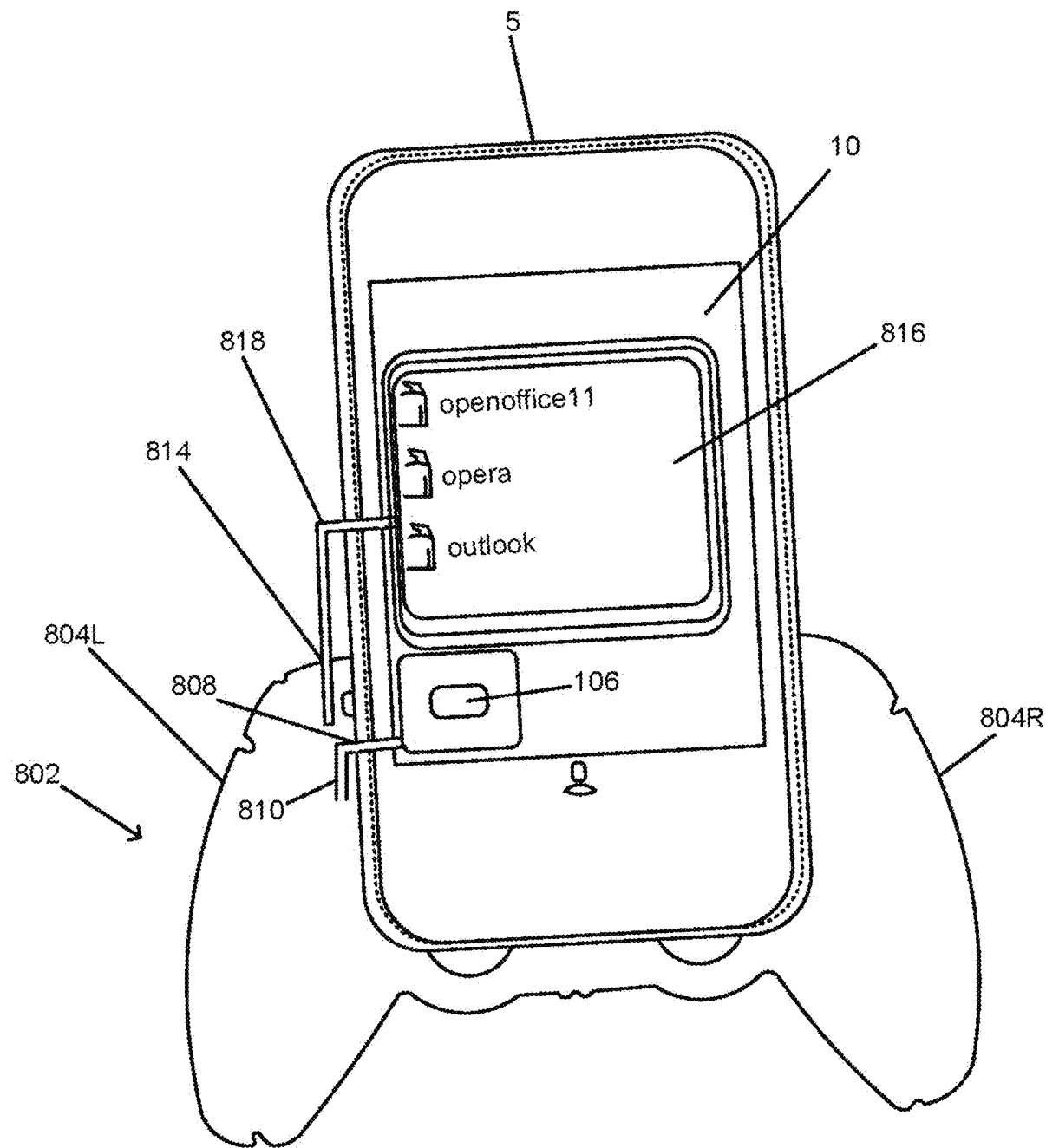
FIG. 8A illustrates a user-device suspension apparatus, according to an embodiment.
Figure 8B:
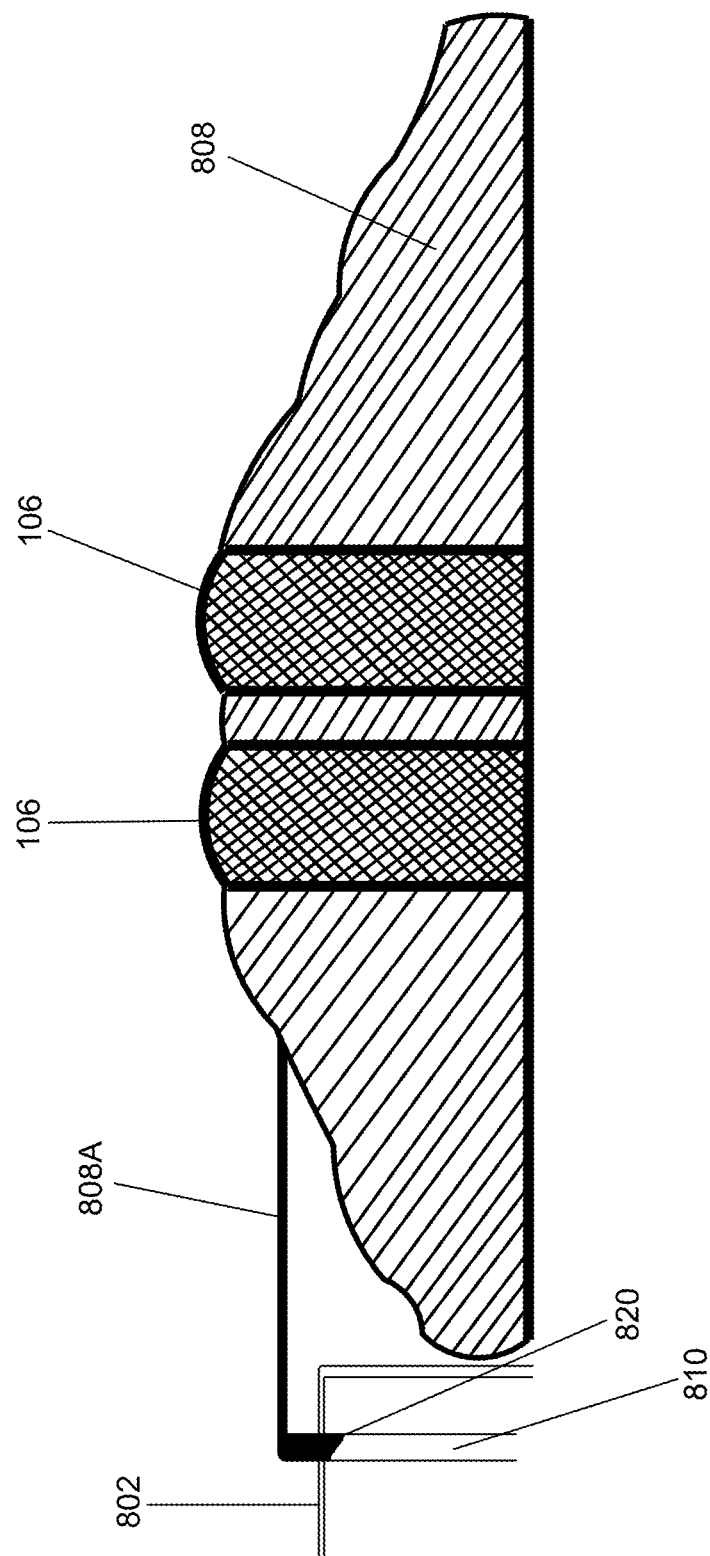
FIG. 8B is a cross-sectional view illustrating the elements of a controller attachment as it is attached to, through an adjustable stem, a receptive suspension device, according to an embodiment.

FIG. 8A illustrates a user-device suspension apparatus and related controller attachment, according to an embodiment. FIG. 8B is a cross-sectional view illustrating elements of a controller attachment, as it is attached, through an adjustable stem, to a user-device suspension apparatus, according to an embodiment.

A suspension device 802 secures a user device 5 and anchors a touchscreen-controller attachment with adjustable stem 808, according to an embodiment. The graspable or handle ends of the suspension device 802 may be molded to the contours of the hand, with rubberized grips, to facilitate gripping and hand comfort. The grippable components may be similar to those of a traditional video-game console, controller and thus, help provide the user with a more familiar tactile experience. "Pocket gamers" seeking a more "clutch-friendly" stead may likely prefer a controller that allows for better grip mechanics and button logistics than the more limited stead of the direct clutch of a user device 5. This may be particularly evident in such situations where the gamer is not looking directly at the controller and may be engaged in rapid and dynamic manipulation of the soft-button controller; such conditions which can easily cause the user device 5 to, for example, become momentarily or partially dislodged from the user's grasp and/or see a user's oriented touch input wander.

The suspension device 802 comprises a left-core assembly 804L and a right-core assembly 804R. The left-core-assembly 804L and the right-core assembly 804R may be joined by an adjustable or fixed strip (not illustrated) or fabricated from a single component. The left-core assembly 804L and the right-core assembly 804R, using laterally positioned inner tracks or channels (not illustrated), may snap or slide into position along the respective sides of the user device 5. A purpose of the channels contained in the left-core assembly 804L and the right-core assembly 804R can be to guide and lock the user device 5 at the centre of the suspension device 802, whilst maintaining fluent viewing of its touchscreen 10. The left-core assembly 804L and the right-core assembly 804R can also accommodate the anchoring of—and furnishing accessibility to—an attached touchscreen-controller attachment with adjustable stem 808 or a respective attachment plurality for controller environments thereby disposed.

The face of the suspension device 802 contains a frontal-slotted groove 810 that accommodates the touchscreen-controller attachment with adjustable (interchangeable) stem 808; the adjustable or interchangeable stem substantially permitting varying placement of the base of the touchscreen controller attachment with adjustable stem 808 on the touchscreen 10, for proper control syncing amongst varying scenarios. The suspension device 802 may contain a plurality of frontal-slotted grooves 810 to accommodate additional touchscreen-controller attachments with adjustable stems 808, if warranted. The touchscreen-controller attachment with stem 808 may house one or more conductive elements 106 designed to capacitively engage (such engagement is not a focus of this illustration) the soft buttons (FIG. 1, reference 20) on the touchscreen 10; thereby providing the ability to engage control of an actionable object 15 from a mounted, attachable interface, as it sits attached to a stead-friendly suspension device 802, in the spirit and scope of this discourse.

The suspension device 802 may include one or more threaded-attachment apertures 814 that can act to suspend accessories such as an eye-friendly magnification device 816; which can readily be positioned to magnify a pocket-sized touchscreen 10 as, exempli gratia, a game or an application is being rendered or a webpage or e-book is being read. The magnification device 816 may cover all or a portion of the touchscreen 10. The magnification device 816 may be mounted to a threaded attachment aperture 814 by an elbow 818. The elbow 818 may be fixed or configured to pivot and/or be manually directed for positioning flexibility. The magnification device 816 may be permanently attached or may be removable. The components of a suspension device 802 are ideally scaled to the proportions of the user device 5 to which it is linked.

The adjustable stem 808A (FIG. 8B) may contain a variable locking head 820 designed to sit securely into the frontal slotted groove 810. The frontal-slotted groove 810 may be incised in varying shapes and dimensions; catering to any variance in design of the locking head 820. The adjustable stem 808A may be constructed of a rigid or yielding material—the latter tending to retain its position until it is manually altered from its position of rest, to facilitate adjustment capabilities of the touchscreen-controller attachment with adjustable stem 808 across a wide range of the touchscreen 10. In this way, the conductive elements 106 have enhanced positional flexibility under a manually-altered configuration. Touchscreen attachment protocol may detail suction, static, removable adhesive backing or any other appropriate means.

Figure 9A:
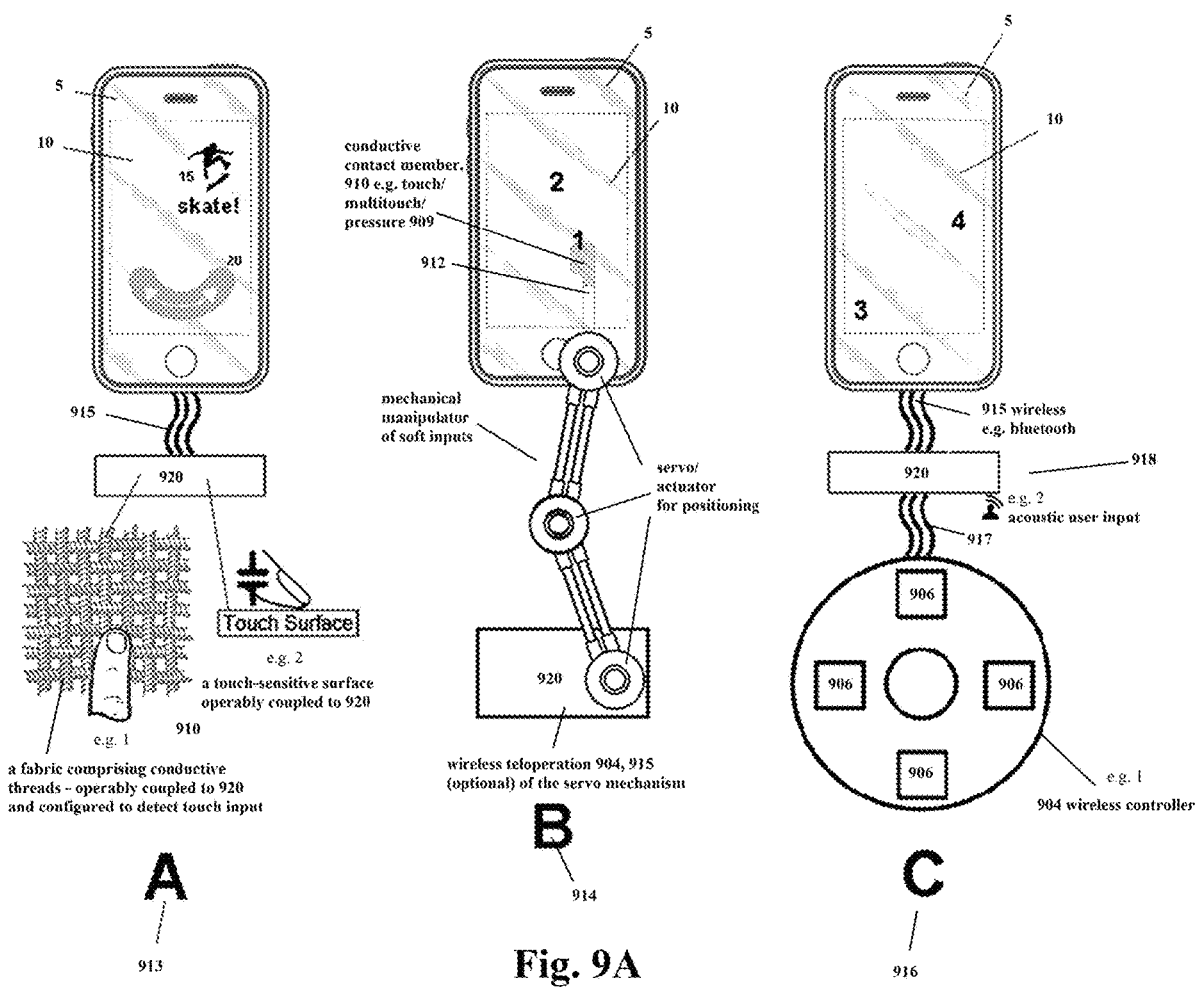
FIG. 9A relates to FIG. 9B and depicts three exemplary control modalities, according to an embodiment. Each of the control modalities shown in FIG. 9A is consistent with and echoic of the fundamental disclosure of the intermediary-transceiver device first made public in parent U.S. Pat. No. 8,368,662.

FIG. 9A Hereupon depicted are three (3) exemplary control modalities of the present invention. The reader notes that each of said control modalities shown (913, 914, 916) is consistent with and echoic of basic operational tenets of the intermediary-transceiver device first made public in parent U.S. Pat. No. 8,368,662. The reader further notes that the depictions are, of course, not to be inferred as being suggestive of limitation.

Control scenario 1 is represented by annotation "A" 913 in FIG. 9A. A conductive interface 910 is operatively coupled to the wireless transceiver 920 as shown and the wireless transceiver 920 is operatively coupled 915 to the touchscreen user device 5, its soft inputs 20 particularly. More particularly, a user manipulation of the conductive interface 910 is received as an input signal by the wireless transceiver 920 unit which then wirelessly manipulates 915 the linked 5 soft inputs 20 in accordance with one or more defined mapping precepts or relationships. Annotation 20 according to this example is a soft half-dial 20 being displayed on the touchscreen 10 and the actionable object being 15 controlled by said soft half-dial 20 is a skateboarder.

According to control scenario 2, represented by annotation "B" 914 in FIG. 9A, a wireless controller 904 is operatively coupled 915 to the wireless transceiver 920 and the wireless transceiver 920 is operatively coupled to the touchscreen user device 5 as shown, its soft inputs particularly.

More particularly in environment "B", manipulation of the wireless controller 904 sends an input signal 915 to the wireless transceiver 920 which then distributes a non-user capacitive load through a respective conductive element 910 (a type of conductive interface) to the linked 5 soft input 1 on the display screen 10. That is, upon application to the screen, the conductive element 910 is used to impel soft-button 1 to action when controlling an actionable object 2. The distribution at soft-coordinate 1 may occur by virtue of an applicator interface 912 and in accordance with one or more defined mapping precepts or relationships.

Ergo, environment "B" 914 is not dependent on the user's finger being an electrical conductor and initiating touch, as the wireless transceiver 920 is configured to serve as a capacitive source and manager of a delivered capacitive load. Or: a machine or device is configured to provide capacitive coupling with a touchscreen using actuators coupled to the applicator 912 and its conductive elements 909, 910. (for the making of touch 910 and pressure 909 inputs (shown))

A soft input 1 may, according to a variant input modality, also be actuated by manipulation of the touchscreen user device's 5 housing under an operable circuit and is not limited to manipulation by touchscreen 10 only. Moreover, one or more parts of the appended FIG. 9A (as will be afforded to all encompassed figures) may, to be sure, also be used independently of the other one or more parts in an operating environment and remain within the teachings of the present invention. For example, the wireless transceiver 920 may be programmed to perform a control operation automatically and not require the control operation be communicated initially from a wireless controller 904.

According now to control scenario 3, represented by annotation "C" 916 in FIG. 9A, a wireless controller 904 is operatively coupled 917 to the wireless transceiver 920 and the wireless transceiver 920 is operatively coupled 915 to the touchscreen user device 5, its soft inputs particularly. More particularly, a manipulation of the wireless controller 904 is wirelessly received 917 as an input signal by the wireless transceiver 920 which then wirelessly manipulates 915 the linked 5 soft input 3 displayed on a touchscreen 10 according to one or more defined mapping relationships. In sum, by manipulating soft input 3, an actionable object 4 on the touchscreen 10 is thereby controlled. As suggested, Bluetooth may be utilized for mapping control, although it is not a requisite wireless protocol. Any other wireless technology or technologies may be used.

FIG. 9B illustrates a touchscreen-controller assembly 902 (read: a screenless, handheld actionable-object controller 902 for at least controlling soft inputs displayed on a linked touchscreen) with a wireless component 903; an assembly thence designed for remote operation, according to an embodiment. A wireless controller 904 with exemplary button inputs 906 is paired to an intermediary-transceiver device 920 using short length radio waves 903 or radio frequency 903, microwave 903, infrared communication 903, near-field communications (NFC) 903 or any other wireless technologies 903 for the act of controlling an actionable object 15 or player, in the spirit and scope of this discourse. The intermediary-transceiver device 920 is configured to act as a relay between the soft buttons 20 on a touchscreen 10 and the command signals of a wireless controller 904. In prelude of further figure description, reference to one or more previous embodiments is first set to remind the reader that one or more soft inputs 20 are commonly manipulated to control one or more actionable objects 15 or players displayed on a touchscreen. At least according to some control operation environments.

The intermediary-transceiver device 920 may be constructed to draw from an internal power source, such as from the holdings of an internal battery compartment, or from an external source such as an electrical receptacle outlet, reducing the potential draw on the user device 5. The assembly may also be constructed to optionally use the power source of the user device 5. The intermediary-transceiver device 920 provides for a variable form factor construction, at least including an enclosure housing an electronic processing unit and a wireless module.

According to some operative environments, the intermediary-transceiver device 920 may contain a single or plurality of tethered conductive elements 910 for contactual application to the soft buttons 20 of a touchscreen 10 by virtue of an applicator 912. Deapplication from at least a first application state may be apace (e.g. representing a normal tap or touch), perdurable, interim or customized. The described operability may, as a case in point, be useful in some specialized, hazardous, restricted (e.g. certain areas of a hospital not permitting wifi, wifi access point bridging or cellular use comprising a network), inaccessible, remote, automated, cost and/or power conserving environments—perhaps atypically disposed.

The conductive elements 910 may be formed from any conductive material or combination of materials including, but not limited to, conductive polymers such as polyaniline, conductive gels, conductive liquids, conductive plastics, metallic or conductive wire, or any material that is conductively (exhibiting conductivity) coated—such as with the use of treated or dipped foam, thread, or fibers—used alone, in filler compositions or in a series of conductive combinations, as aptly conjoined.

Returning more directly to the figure, as a wireless controller 904 is engaged it sends 903 control or navigation commands to the intermediary-transceiver device 920, a mediating agent, for processing, and thereby causing the respective conductive elements 910, operably associated to the intermediary-transceiver device 920 (and through contactual association, the soft input 20), to be engaged accordingly.

The intermediary-transceiver device 920 may comprise an innate capacitive source and capacitive manager, supporting the ability to engage a conductive element 910 or plurality of elements 910—by drawing from this innate capacitive source and managing its "transfer" or distribution to a respective conductive element 910 counterpart; all in a manner faithful with the command gestures of the wireless controller 904. This, without the need of actual direct finger contact with the conductive elements 910 or soft inputs 20 by the user in the act of soft-input manipulation.

Said another way, the intermediary-transceiver device 920 will precisely marry the control gestures of the wireless controller 904 with the reciprocal physical conductive elements 910, thereby engaging control of an actionable object 15 or player in the exact manner and order in which the command is sent by the wireless controller. With emphasis, a system has thus been delineated where conductive engagement is not dependent on the user's finger being an electrical conductor and initiating touch (the control input of a finger) with the touchscreen 10. The touchscreen 10 will respond to these wirelessly conveyed signals—as an innate capacitive source is induced by the intermediary-transceiver device 920 and then respectively relayed to the touchscreen 10—just as it would to direct touchscreen 10 contact from the control input of a user's finger (which, as suggested, is no longer requisite, as per this embodiment).

A hybrid system utilizing both wired and wireless aspects is illustrated, although use of a hybrid system in this example is not intended to be limiting. The innate capacitive source and/or manager, of course, being dispensable components under wholly wireless operating scenarios 918 (of FIG. 9A).

Other embodiments described or addressed herein, or ones that otherwise become obvious to a person of skill in the art upon reading this specification, may similarly be adapted for wireless use through, for instance, the introduction of an intermediary-transceiver device 920 to an embodiment or embodiments lacking such a device. Introduction of an intermediary-transceiver device 920 may offer certain embodiments the potential to become wholly "wire free" 918 or wireless 918 since the transceiver can communicate directly with both the user device 5 and any specially-designed hand-held controller device, or potentially offer a user the underpinning of "less wires" in a hybrid system (e.g. 913 of FIG. 9A comprising a conductive interface being wirelessly mapped), where available.

Such wireless button input 906 elements of a wireless controller 904 are, of course, referred to in the exemplary and are not intended to suggest limitation toward any of the serviceable input dispositions that may be incorporated into a wireless controller or its operational environment. In some instances, the addition of a servomechanism or the like may also be introduced to manage certain gestures or motions, such as with trackball rotation of a wireless controller 904 in controlling an associated soft input counterpart.

Figure 10A:
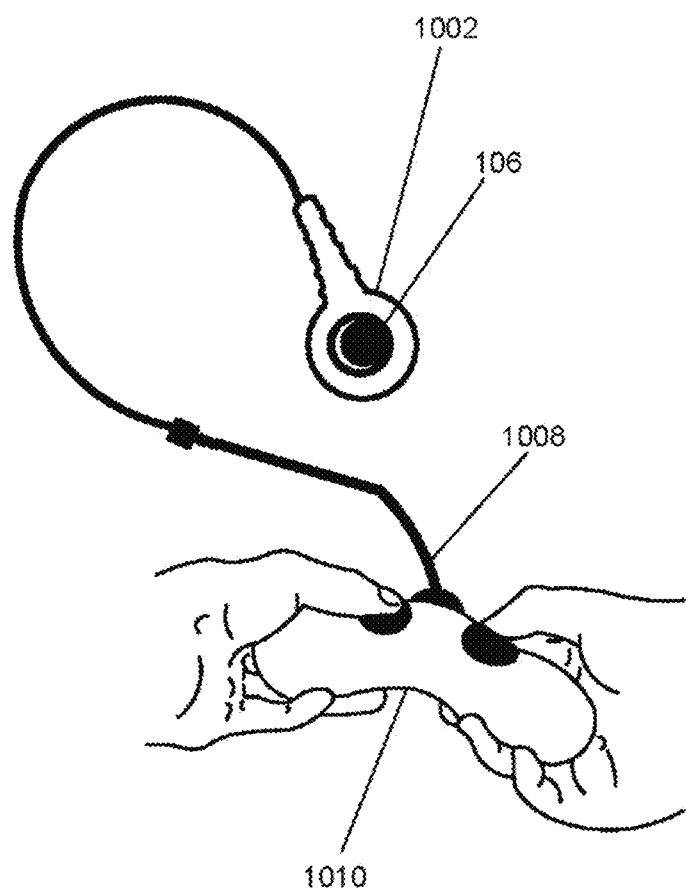
FIGS. 10A and 10B are views of a touchscreen-controller assembly, designed for remote operation, according to an embodiment.
Figure 10B:
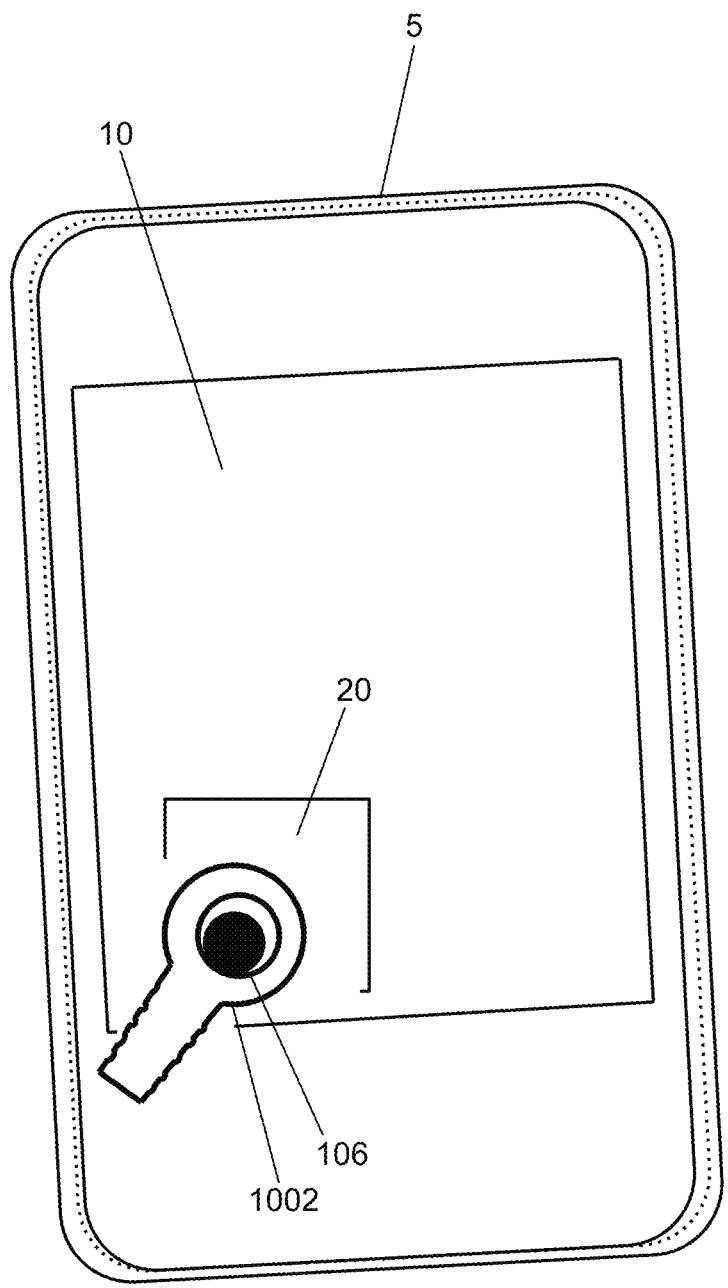

Moreover, technologies such as, but not limited to, NFC can be used to further permeate a control environment, where applicable, beyond those embodiments in which the technology is itself mentioned. The intermediary-transceiver device may also be referred to as an intermediary-mapping device for functioning as a mapping administrator FIGS. 10A and 10B illustrate a touchscreen-controller assembly, more particularly, a controller for controlling the soft inputs displayed on a touchscreen to thereby control an actionable object, designed for remote operation, according to an embodiment. See also FIGS. 3A, 3B.

By way of illustration and not by way of limitation, each tip of the conductive elements 106 may comprise a liquid conductor—fully enclosed in an air-tight, plastic-wrap seal 1002—designed for application to (and deapplication from) the soft-buttons 20 displayed on a touchscreen 10 user device 5, as illustrated in FIG. 10B. Each tip of the conductive elements 106 may be applied to the touchscreen 10 by suction, static, removable adhesive backing or any other appropriate means, individually or collectively through the strategic application of a plurality-containing body such as a matrix (See FIG. 12). A matrix may be designed to have each of the plurality of air-tight, plastic-wrap seals 1002, each complete with an inherent conductive path serviceable to this embodiment, concurrently (and independently) placed in a contactual manner with its respective soft-button 20 counterpart.

Similarly, a mountable-attachment matrix with housing may be designed to host a plurality of liquid-filled, air-tight, plastic-wrap seals 1002, each complete with an inherent conductive path serviceable to this embodiment, for actuation, and may be replaced by less spatially intensive seals 1002 housing a plurality of conductive elements 106 arranged in a reciprocal environment (the arrangement being dependent on the soft-button controller to which the individual seal 1002 is respectively applied to and intended to actuate), similar to the appearance and arrangement of FIG. 2, plus the accretion of a cable 1008 component in an exemplary disposition.

The material base surrounding and isolating the plurality of air-tight, plastic-wrap seals 1002 (as stated, with each seal housing one or more conductive elements 106) may be non-conductive in nature, such as a base material of plastic or rubber. A plurality of cables 1008 may extend from the remote controller 1010 (not illustrated) and a plurality of the air-tight, plastic-wrap seals 1002, each complete with an inherent conductive path serviceable to this embodiment, may extend from a single cable 1008 (also not illustrated) in alternate embodiments.

The liquid conductor in the air-tight, plastic-wrap seal 1002 may be used in conjunction with a thin length of conductive wire—for example copper, but any conductive wire or conductive material may be used to interface with at least a user's capacitive load during a load bearing event—which has its bare, metallic tip immersed, anchored and wholly sealed in the conductive liquid located in the air-tight, plastic-wrap seal 1002 in order to form a conductive path and to prevent evaporation. The thin length of conductive wire, acting as a conductive element 106, is substantially housed in a connecting cable 1008 that acts as a wire conduit. The wire-end opposite to each tip inserted and sealed into a respective air-tight, plastic-wrap seal 1002 is connected to a conductive element counterpart found on the remote actionable-object controller 1010. Thus, given an inherent conductive path is maintained, upon manipulation of the conductive input/element counterpart, it offers the user of the remote actionable-object controller 1010 positional and distance flexibility away from the touchscreen 10 as an actionable object 15 or player is being controlled.

With the freedom of distancing the remote actionable-object controller 1010 from the portable-hardware's touchscreen 10—made possible through the described implementation of a tractable corded length of conductive wire according to an embodiment—the remote actionable-object controller 1010 can take on whole new design capabilities and more closely (and more broadly) borrow from the user experience and physical expression of the larger, console-based game controllers used in home consoles/gaming systems. Robust potential and support for controller customization exists in its spirit and scope.

Conductive elements 106, in whole or in transmissive part, are made of any electrically-conductive material or materials, including but not limited to, conducting polymers such as polyaniline, conductive gels, conductive liquids, conductive inks, conductive wire and/or any material that is conductively (exhibiting conductivity) coated or dipped—such as with the use of treated foam, thread, or fibers—used alone, in filler compositions or in a series of conductive combinations, as aptly conjoined to ensure a proper conductive path remains present throughout. For any single conductive reference (such as the use of a "wire" interface), the reader should regard that reference as being potentially interchangeable with any and all serviceable conductive elements 106 or interfaces and not just those listed above.

This embodiment further illustrates the potential for the combination of different conductive materials or properties—used in a link—to complete a conductive path necessary as a means of controlling an actionable object 15 or player, in the spirit and scope of this discourse. The conductive path described herein is not suggestive of limitation or limitation to the elemental components comprising the path, as described. Therefore, without limitation, it is to be underscored that any conductive path that is serviceable to the spirit and scope of this discourse may be utilized for remote-operating scenarios. A conductive path may be comprised of a singular conductive component throughout the path or a conjoined plurality of distinct components comprising a path. The noted components can be designed in scale to the hardware in which it is applied.

Figure 11:
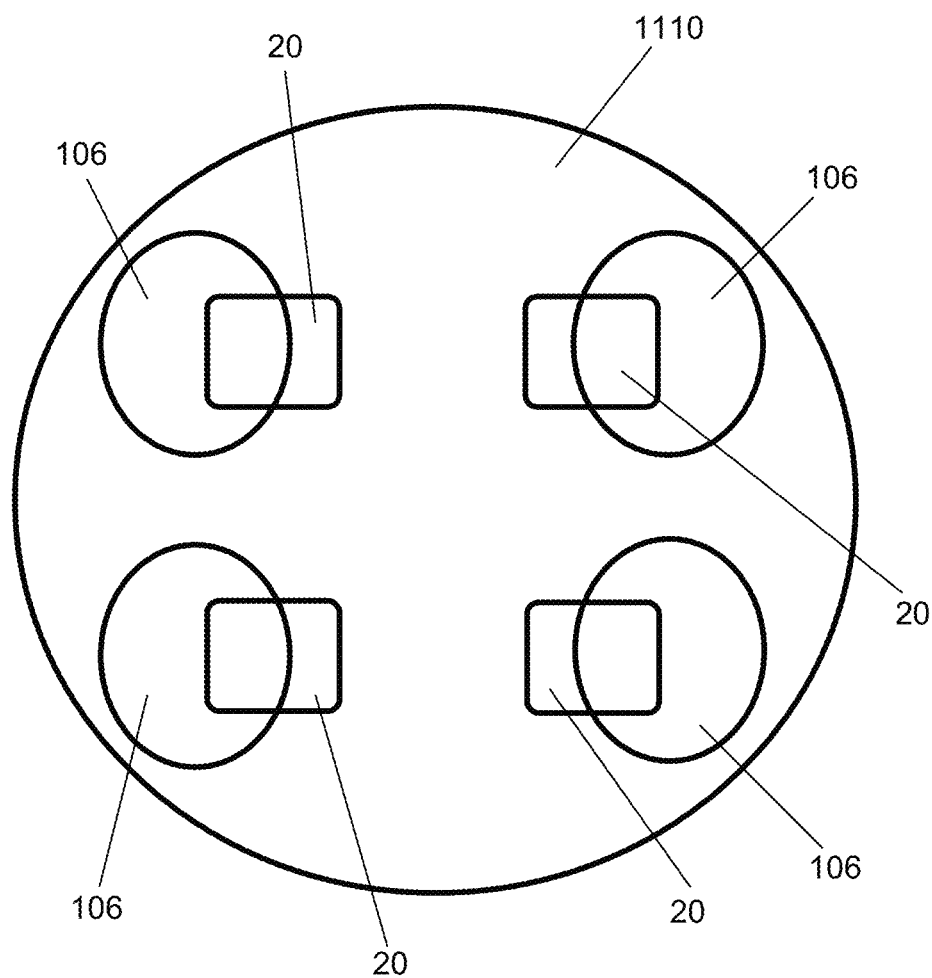
FIG. 11 depicts a means of expanding the size of the touchscreen-controller attachment, against a fixed set of soft buttons, according to an embodiment.

FIG. 11 illustrates a means of expanding the size of a touchscreen-controller attachment 1110 associated with a fixed set of soft buttons 20; an initiative that may yield increased user comfort, control precision and tactile deployment, this according to an embodiment. Due to the small size of some touchscreens 10 and the potentially dense arrangement of soft buttons 20 this small footprint may yield, amongst other considerations, a user may wish to increase the actual size of the touchscreen-controller attachment 1110 beyond the original soft-button 20 parameter or alter the button disposition.

The conductive elements 106 may be configured to contact the soft buttons 20 displayed on a user device 5 on the exterior edges of the soft buttons 20. Through external edge appropriation, the size of the touchscreen-controller 1110 or actionable-object controller 1110 and/or its button disposition may therefore be expanded (the expansion measurement of which are preferably dependent on the variable of the transverse-perimeter dimensions of the soft buttons 20) in an effort to help improve user comfort, efficacy and control ergonomics, while still maintaining full functionality since a conductive path remains present in its spirit and scope. The noted components are ideally designed for the scale of the hardware to which it is applied.

Figure 12:
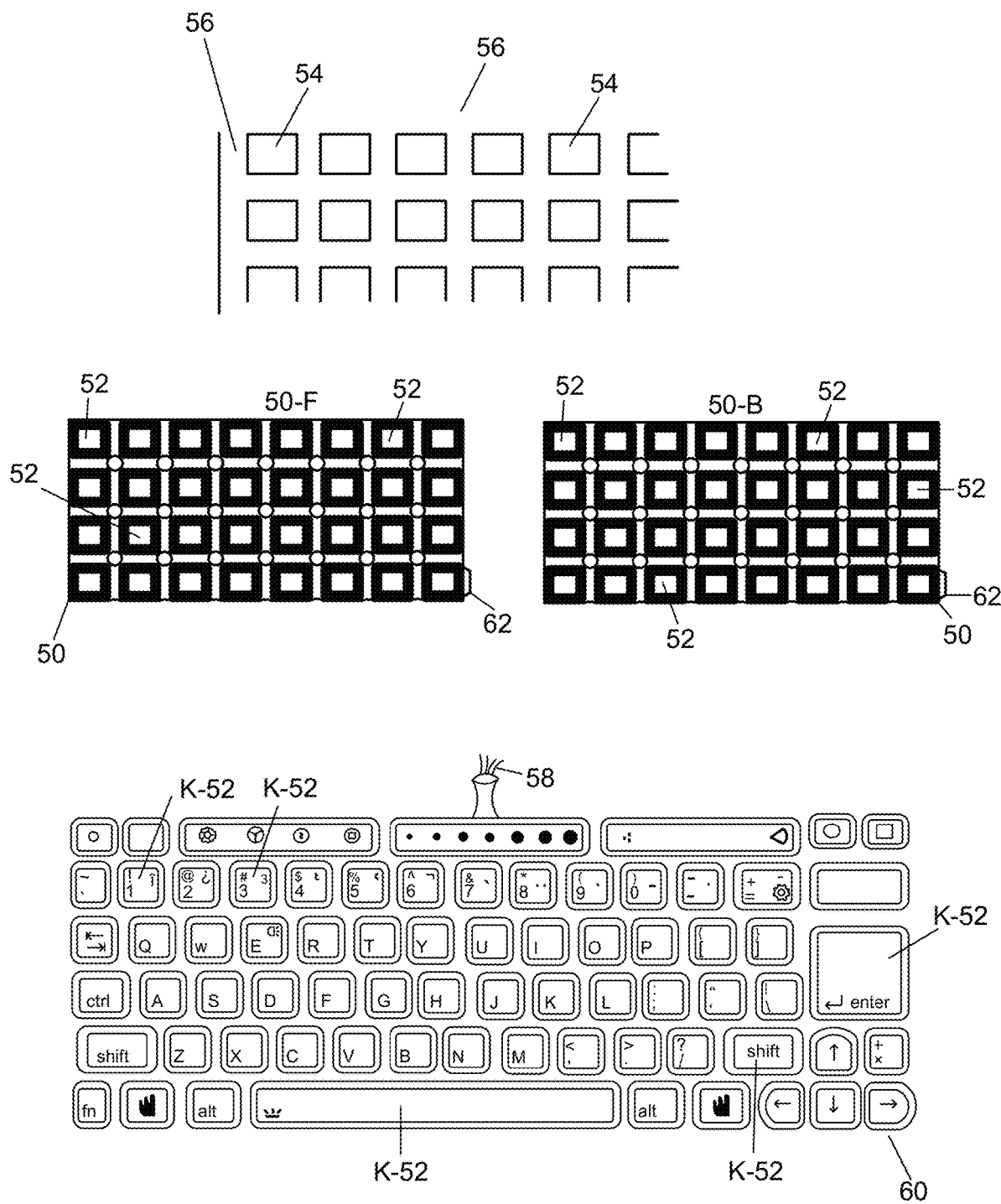
FIG. 12 is a listing diagram of components related to a data-entry ensemble; including a touchscreen-controller attachment matrix—comprising a plurality of conductive elements; a receptive keyboard, keypad or data-entry device designed to engage soft data-entry or soft buttons and a hardware touchscreen; according to an embodiment.

FIG. 12 The present invention embodies an applied-matrix overlay containing a plurality of conductive elements 52 that are fittingly tethered to both the graphical soft-buttons at the face of the attachable matrix and the respective hard keys of a specially-designed keyboard, keypad or data-entry device via a conductive path extension. Configured as such to at least facilitate the premise of remote data-entry (including all environments not requiring a user to touch the screen to type) for touchscreen based electronics or hardware, as equipped. Applications may vary from the illustrated articulation and still embody its teachings.

Figure 14:
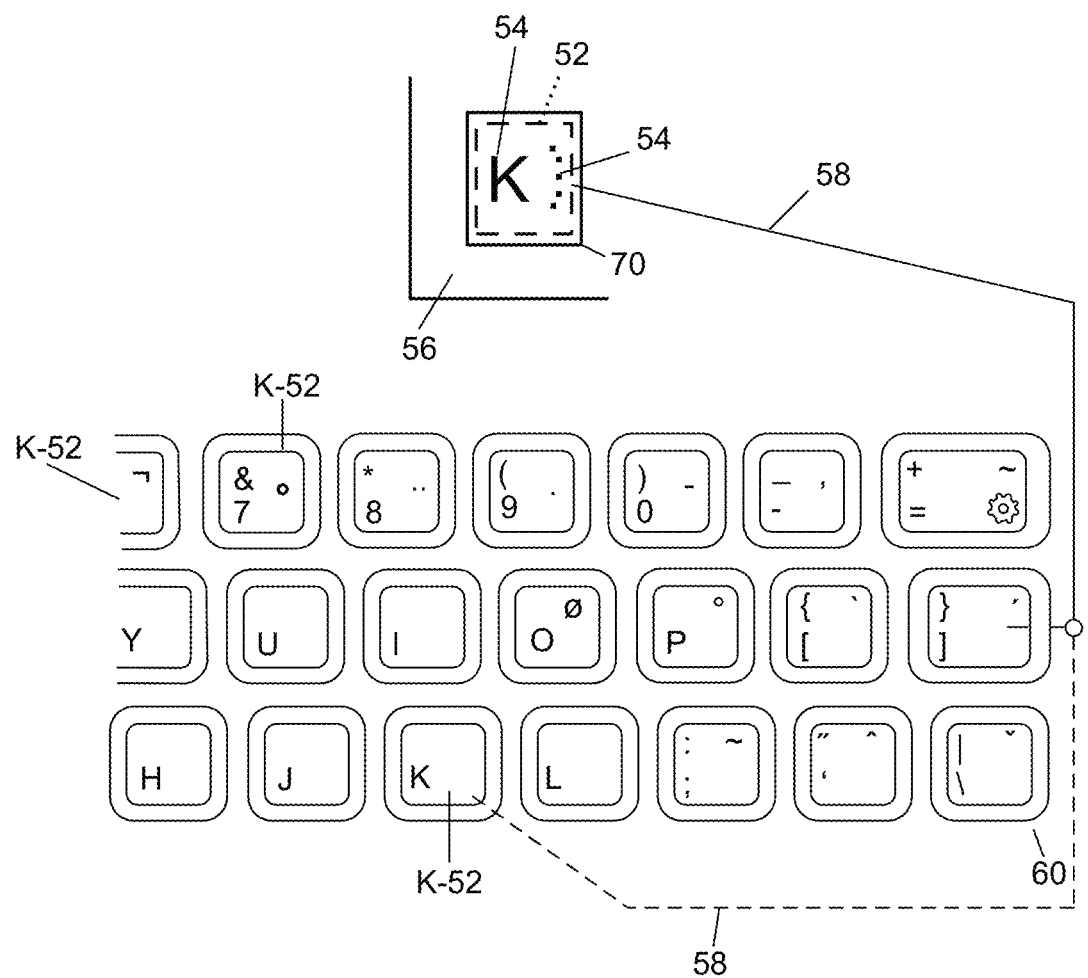
FIG. 14 is an illustration of an embodiment suggesting the premise of "toggle-mode", in the spirit and scope of this discourse.

It should be noted that in order not to congest the diagrams labeled in FIG. 12, FIG. 13 and FIG. 14, only partial quantities of the conductive elements, the soft-buttons or data-entry buttons and the conductive "hard keys" or "physical keys" associated with a receptive keyboard, keypad or data-entry device, may be illustrated and such illustrations are not intended to be limiting. A person skilled in the art (PSITA) should readily ascertain like quantities and composite characteristics of each of the groupings and its typical whole in the spirit and scope of this discourse.

As a preamble to further detailed discussion; graphical soft or data-entry buttons 54 rendered on a hardware's touchscreen 56 include, but are not limited to, symbols, numbers, alphabetic characters, graphics, etc. and may further include navigation, function, toggle and modifier keys, etc. (such as Ctrl, Shift, Alt, and so forth). The breadth of possible graphical soft-buttons or data-entry buttons 54 is expansive and includes any and all keyboard-based characters for purposes of this discourse—from both traditional and non-traditional keyboards—in both English and non-English languages.

Control of an actionable on-screen object, in this particular embodiment being the data-entry buttons 54 themselves, comprise symbols, alphanumeric characters, graphics, etc. and navigation, function, toggle and modifier keys. Said control being rooted from a user's capacitive load being transmitted through a communicable matrix interface. Human skin having dielectric properties.

Referring now to the present invention in more detail. FIG. 12 represents an embodiment with a decoupled touchscreen-controller matrix 50 comprising a plurality of conductive elements 52; where each individual conductive isolate 52 in the plurality (at the face 50-F of the matrix) may be designed to be contactually applied to its respective graphical soft-button or data-entry button 54 counterpart. The premise of being "contactually applied" will be particularized by lineation in FIG. 13, with the introduction of co-ordinate mapping and further detailed in FIG. 14.

By aptly aligning to a point of contact, the respective conductive isolates 52 of the conductive elements 52—found at the face 50-F of the touchscreen controller attachment matrix 50—with their graphical soft-buttons or data-entry buttons 54 counterparts displayed on the hardware's touchscreen 56, and then extending the conductive path of said conductive isolates 52 to the respective conductive keys K-52 of a receptive keyboard, keypad or data-entry device 60, the capacitance stored, for instance, in the finger of a user, is transferred onto the hardware's touchscreen 56, just as if the user was touching the screen directly. The transfer commencing upon user contact with the conductive keys K-52 (unless a conductive key is spring-mounted and/or designed with a contactual gap and requires the user to concurrently touch, then depress a key for actuation, see FIGS. 4B, 5 for related discussion).

This process thereby permits, while still using the control input of a finger, control of the data-entry buttons 54 remotely or away from the touchscreen 56. More particularly, the control input of a finger's capacitive load. Ergo, an enhanced, more user-friendly data-entry interface is presented that can at least help bolster comfort, ergonomics, productivity and simplicity of use. Input efficacy is markedly improved due to the implementation of a more precise control structure, a greater familiarity of association linked to at least traditional keyboard use in a desktop environment and a return to a tactile interface for the user, amongst other potential betterments. As suggested, this can significantly enhance the data-entry experience when compared to traditional or native use.

Each of the individual conductive elements 52 of the plurality, or a conductive isolate 52 expressed singularly, possesses conductive-path extension capabilities from the back 50-B or tethered-side of the touchscreen controller matrix 50. One possible means of extension (not illustrated), amongst others, is achieved by incorporating, through fusion or any other suitable manner faithful to a conductive path, a conductive length of wire 58 into each of the respective conductive elements 52 at the back 50-B or tethered-side of said matrix 50—on one end—with care to ensure a conductive path remains present throughout, in the spirit and scope of this discourse.

Application to the hardware's touchscreen 56 is made with care to ensure contactual consistency with the graphical soft-buttons or data-entry buttons 54 for intended mapping. Each embedded conductive isolate 52 remains wholly transmissive of a conductive path between at least the front and back of the matrix 50. As to the opposite end of the conductive length of wire 58, as per this example of a use made possible under its teachings, it is respectively attached to the reciprocal conductive key or plurality of keys K-52 (a plurality is stated here as an acknowledgement for the distinction of toggle mode, which is discussed later in this filing) found on a receptive keyboard, keypad or data-entry device 60.

The shape of the matrix 50 can be designed to be manipulated to match up with variously sized soft keys and touchscreens, for example by having the elements of the matrix 50 easily snap together and apart in various configurations or having a pliable matrix that appropriately maintains its shape until manipulated by a user, if so coveted. Similarly, single conductive elements 52 may be manipulated individually to accommodate differences in the characters displayed on a touch screen, should design permit, although any examples cited for matrix manipulation are not suggestive of limitation.

The touchscreen-controller attachment matrix 50 and its plurality of conductive elements 52 are designed to be applied, attached or affixed otherwise operably coupled to the touchscreen device. A flexible, hardware-friendly sleeve or case may also be used to position a keyboard at least comprising conductive keys. The touchscreen-controller attachment matrix 50 may, additionally, contain an exteriorly protruding tip 62 that can be used for convenient detachment of the touchscreen-controller attachment matrix 50 from the hardware's touchscreen 56.

The conductive elements 52, or any single conductive isolate 52 of the plurality, in the spirit and scope of this discourse, can be made of any electrically-conductive material or combination of conductive materials as aptly conjoined, in whole, in transmissive part or in a series, including but not limited to, conducting polymers such as polyaniline, conductive gels, conductive liquids, conductive inks, conductive wire and/or any material that is conductively (exhibiting conductivity) dipped or coated—such as with the use of treated foam, thread, or fibers or related filler compositions, to which ensuring a proper conductive path remains present throughout in the spirit and scope of this discourse. One or more conductive elements 52 or interfaces 52 may, of course, also be disposed into everyday objects and surfaces as per the disclosure's teachings (i.e. said objects and surfaces being adapted for receiving and/or distributing a capacitive load in at least manipulating actionable objects).

The conductive material comprising a single conductive element 52 or conductive isolate 52 can differ from others in the plurality, but in this embodiment, remains consistent in order to streamline the manufacturing process and contribute to economies-of-scale advantages. The conductive elements 52 may be referred to in its singular form, as it has been above and may bear root from its plural counterpart. Regardless, such singular or plurality references made will be understood by those skilled in the art in the context they were intended.

Typically, in exemplary accordance with one or more aspects of this modality, the conductive elements 52 are individually insulated from each other to prevent contact with, and "conductive bleed" or "capacitive bleed" from, competing conductive elements 52; unless special-case operating scenarios require an instance of capacitive bleed. "Capacitive bleed" can result from improper shielding of the individual conductive isolates 52 or related conductive 52 apparatus. Since a plurality of conductive lengths of wire 58 (each constituting an instance of conductive elements 52) may exist contactually in cable conduit housing, this potential event underscores why shielding is especially important; as to ensure intended data-entry actions result as anticipated. The premise, clearly, also being applicable to the configuration of conductive keys.

Ideally, the conductive elements 52 and corresponding touchscreen-controller attachment matrix 50 are dimensionally articulated and proportionate to the hardware ensemble they are designed for. The touchscreen-controller attachment matrix 50 is sufficiently wide and long to ensure the respective conductive elements 52 at its face 50-F are conductively aligned with the graphical soft-buttons or data-entry buttons 54, but not overly wide and long to unnecessarily block or encroach germane screen area or, similarly, skew any necessary contactual-alignment requirements. Also, a matrix square containing a singular conductive isolate can vary greatly in dimension from a competing matrix square of a conductive isolate and standardization of squares and square dimension across a matrix is not requisite.

Of particular note to the reader, embodiments and practical application of this subject matter can show great divergence in the field from the appending drawings (pertaining to this and other figures) and still remain consistent with the operational tenets of its teachings. Ensembles of the present invention, and any various embodiments listed and encompassed, can vary in degree of construction complexity and configuration. Subjects, respective components, sub-components or a particular arrangement thereamong, as found in FIG. 12 (and the filing in its entirety), may not be shown to exact specification, configuration or scale.

The conductive elements 52 are conductively aligned with the graphical soft-buttons or data-entry buttons 54, and may be attached to the hardware's touchscreen 56 as a possible interface, and in doing so, mapped with care. Not suggestive of limitation.

The attachable matrix 50 may also be incorporated as a stand-alone entity (although this is not the focus of this embodiment) where it seeks the control or touch input of a finger directly upon touchscreen attachment and does not require the path extended to the conductive keys K-52 of a receptive keyboard, keypad or data-entry device 60. The conductive elements 52, described collectively, or each respective isolate in the singular, may be transparent or translucent, minimizing any loss of view due to operational placement of the attachable matrix 50. Such an operating scenario may see a stand-alone matrix, for instance, incorporated into a smart phone's or tablet's mobile case, casing or housing under a retractable design (to engage and disengage the matrix), in the spirit and scope of this discourse.

The user experience may be further improved when the disclosed premise of remote data entry is married, synergistically, to such technologies as: "Component AV interfaces", that allow, exempli gratia, a compatibly-equipped smart phone to be connected—and to have its screen output transferred—to televisions fitted with component video inputs or similar linking technologies. Coupling with such technologies can help create an environment that even more profoundly liberates the texting or data-entry experience for users of touchscreen 56 hardware when compared to use in a native environment. Business travelers may also find this coupling especially liberating.

Referring now to FIG. 13 in more detail, in an embodiment, a two-sided view of a touchscreen-controller matrix 50 is shown (from a vantage of its face 50-F and back 50-B), with its set of conductive elements 52, each exhibiting uninterrupted conductive paths running transversely or across the entire thickness of the matrix. For clarification purposes regarding correct application of the face 50-F of the touchscreen-controller attachment matrix 50, a subset of a traditional QWERTY-based arrangement of graphical soft-buttons or data-entry buttons 54 is depicted (non-toggle mode) to suggest intended conductive lineation of the face 50-F of the matrix to the hardware's touchscreen 56, upon application.

Then, in order to more clearly depict transitional lineation, the back 50-B of the corresponding touchscreen-controller attachment matrix 50 is also produced in FIG. 13 to show a completed conductive path from an input end to an output end, amongst the illustrated parts, in the spirit and scope of this discourse. The back is shown from a top-down orientation, as if looking down at the touchscreen-controller attachment matrix 50, with the front 50-F vantage naturally obstructed from view upon matrix application in practice of this example (hence, the inventor has chosen a side-by-side illustrative manner here for simplicity).

The back 50-B of the corresponding touchscreen-controller attachment matrix 50 shows an extension of its conductive elements 52 to the conductive keys K-52 (in this case, 2 keys, the actionable letters "A" and "B", respectively, representing only a constituent view of the full set of keys ordinarily present in a QWERTY design) of a receptive keyboard, keypad or data-entry device 60. Said differently, the conductive elements 52 found at the back 50-B of the corresponding touchscreen-controller attachment matrix 50 are conductively married, to an appropriate input counterpart, by extension via conductive lengths of wire 58 (as a possible, but not an exclusive means of extension) to the corresponding conductive keys K-52 (key-based conductive elements 52), as situated on a receptive keyboard, keypad or data-entry device 60. Again, the actionable letters "A" and "B" are only a partial representation of the actionable physical keys typically available in a traditional QWERTY environment (a subset of a toggle environment) and the array and disposition of both the graphical soft-buttons or data-entry buttons 54 and conductive keys K-52 displayed in practice can differ widely from this illustration and are not suggestive of limitation.

Moreover, and of note, other configurations of at least one of operability, connectivity and lineation are expressly possible. In reference to the figure, the reader understands that an operable coupling may occur independently from the need to interface with the touchscreen surface directly and may occur so by wire, wirelessly or both as supported in at least parent U.S. Pat. No. 8,368,662. This also applies beyond the conductive keyboard interface presented here.

The conductive element 52 individually assigned and aptly attached (via a conductive isolate found at the face 50-F of the touchscreen-controller attachment matrix 50) to the "A" key of the graphical soft-buttons or data-entry buttons 54 found on the hardware's touchscreen 56, will then see said conductive isolate assigned, while maintaining an inherent conductive path, from the back 50-B of the corresponding touchscreen-controller attachment matrix 50, to the "A" key found on the specially designed keyboard comprising a plurality of conductive keys K-52—composed of a conductive material 52—in the spirit and scope of this invention.

To illustrate contactual placement of a single conductive isolate (comprising the conductive elements 52) found at the face 50-F of the touchscreen-controller attachment matrix 50, with the respective graphical soft-buttons or data-entry buttons 54 found on the hardware's touchscreen 56, an X,Y grid is shown adjacent to both the touchscreen-controller attachment matrix 50 (dual sides) and graphical soft-buttons or data-entry buttons 54. The "A" key of the graphical soft-buttons or data-entry buttons 54, for example, is located at position X1, Y2 and noted. The respective "A" key position at the noted position X1, Y2 on the matrix seeks contactual overlay—upon, for example, attachment of the touchscreen-controller attachment matrix 50 at its face—with its data-entry soft button 54 counterpart. Successful contactual placement of the touchscreen-controller attachment matrix 50 with the graphical soft-buttons or data-entry buttons 54, in the spirit and scope of this discourse, will see each set of the identical X,Y coordinates in the control structure (comprising a conductive path) matched in their totality upon matrix overlay. A typical matrix can have some of its individual conductive isolates vary in size, positioning and structure (versus the identical grid-composition of the matrix illustrated here) to more closely reflect the graphical renderings on the hardware's touchscreen 56 to which it marries and this illustration is not suggestive of limitation.

Similarly, the conductive elements 52 assigned and aptly attached (via a conductive isolate found at the face 50-F of the touchscreen-controller attachment matrix 50 at position X5,Y1) to the "B" key of the graphical soft-buttons or data-entry buttons 54 (at position X5,Y1) found on the hardware's touchscreen 56, will then see said conductive isolate similarly assigned, ensuring a conductive path remains present, to the "B" key found on the specially designed keyboard, keypad or data-entry device comprising conductive keys K-52 (composed of a conductive material or elements 52) from a rear-modal matrix extension (at position X5,Y1), in the spirit and scope of this discourse. And so on, preferably until all available graphical soft-buttons or soft data-entry buttons 54 of a given application (in both toggle and non-toggle mode on a hardware's touchscreen 56) are properly accounted for and conductively mapped to their respective conductive keys K-52 on a receptive keyboard, keypad or data-entry device 60.

Illustrations shown in FIG. 13, and throughout all diagrams, are not necessarily to scale and may be prone to modification, adaptation and/or variance in practical application, in the spirit and scope of the present invention. Disclosures and renderings herein are not intended to be limiting. A person skilled in the art (PSITA) may also seek referral to FIG. 12 and other embodiments to appreciate the broad spirit and scope of this embodiment.

FIG. 14 details the premise of toggle mode, with a simple, hypothetical illustration of a plurality of graphical soft-buttons or data-entry buttons 54 that interchangeably share a fixed location on a touchscreen (and affixed matrix), as various character sets are deployed in a toggle on a touchscreen 56. In this hypothetical example, and disclosed embodiment, the graphical soft-buttons or data-entry buttons 54 "K" and "]" share the same fixed screen location, but not concurrently, each of these keys becomes enlisted to a shared fixed screen location only when actuated by a toggle; in which both keys are typically rendered independently, as part of a set of touchscreen keys or characters in an aggregate set or rendering. Toggle mode, in the spirit and scope of this discourse, may be necessary when a touchscreen's geography is limited in size (such as with the physical constraints instanced in a mobile environment). It would, for example, not usually be either efficient or practical for pocket-sized, Internet-enabled smart phones to fit the entire QWERTY-based keyboard in a single, graphical-rendering entirety on its limited touchscreen size. Toggle mode makes, exempli gratia, the QWERTY-load more manageable. Arrangements and character sets of the graphical soft-buttons or data-entry buttons 54 displayed in practice may vary from those depicted in this hypothetical example (and elsewhere) and merely serve as a guide to understanding the premise of toggle mode.

Where a toggle is effected for graphical soft-buttons or data-entry buttons 54 that share a fixed geography or position (toggle area) on the hardware's touchscreen 56, a conductive length of wire 58 may be fused (or conductively serviced in any appropriate manner) to the conductive isolate at the real-modal matrix point sharing a toggle area 70 upon contactual placement. An additional conductive length of wire 58 intended to actuate a shared toggle area may then be attached accordingly, either directly at the same matrix point of the conductive isolate sharing a toggle area 70 (not shown) or along the corded length of an established conductive length of wire 58 (shown in phantom as a dashed line), careful to ensure a conductive path remains throughout, in the spirit and scope or this invention.

The respective conductive lengths of wires used in a toggle situation described above, will, at the corded lengths opposite the touchscreen-controller attachment matrix 50 fusion and/or amalgamation points (and at each respective conductive isolate comprising the matrix at full employment) be attached to the respective conductive keys K-52 on a receptive keyboard, keypad or data-entry device 60 in order to facilitate keyboard-based text or data entry, remotely from a touchscreen 56. The fusion point is the point where the wire meets the attachment matrix 50 and the amalgamation point is the point where the wires from the different conductive keys K-52 are joined, although in some operating scenarios, no amalgamation point exists because the wires may see direct contact with the attachment matrix 50 at the conductive isolate. A person skilled in the art (PSITA) may also seek referral to FIG. 12 and other embodiments to appreciate the spirit and scope of this discourse.

Figure 15:
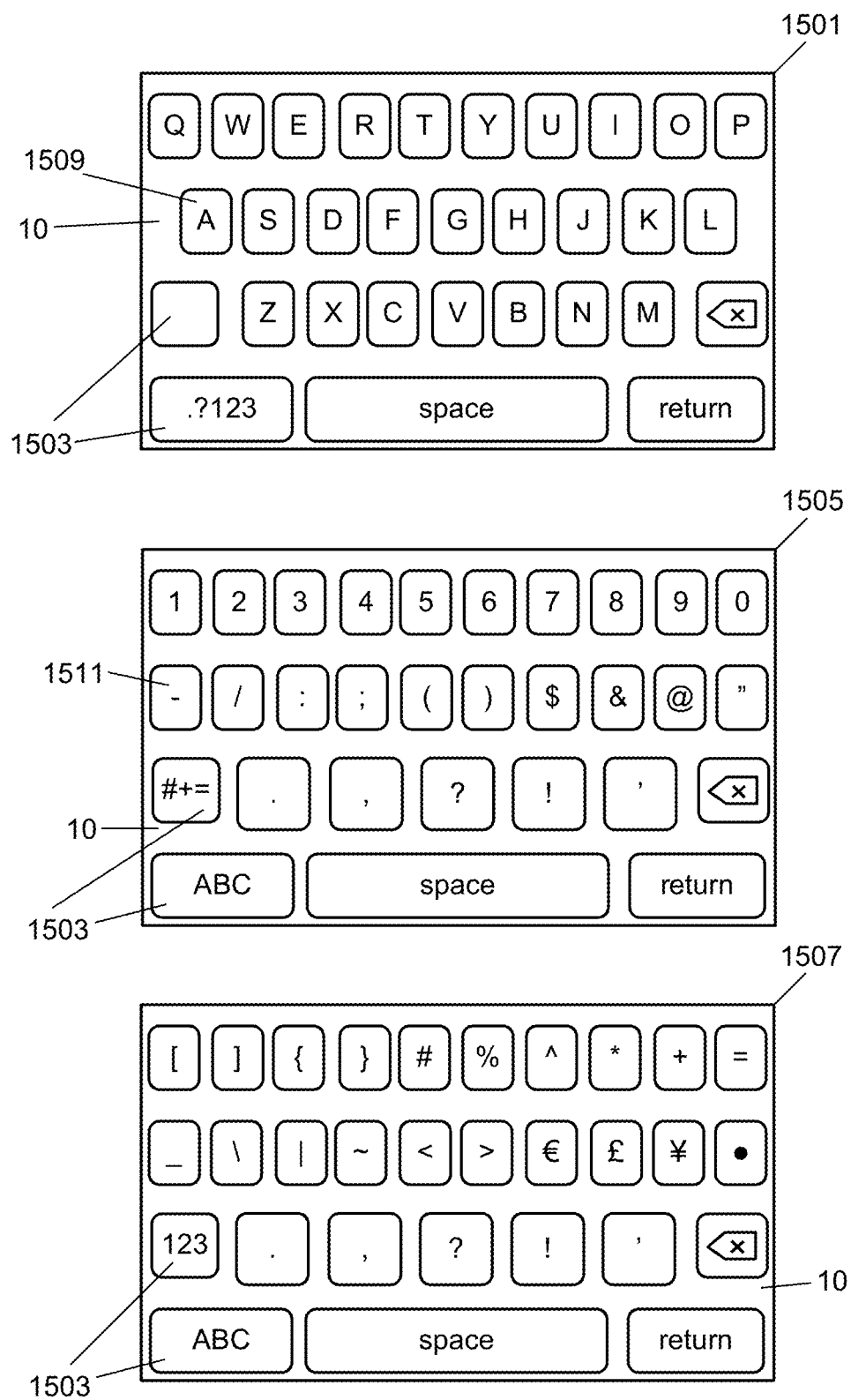
FIG. 15 is an illustration of a plurality of various character or keyboard sets that are linked in a toggle, the premise of "toggle" being requisite for devices subject to space limitations.

FIG. 15 illustrates three distinct character sets or digital "keyboards" presented on a touchscreen 10; each of which rely on a "toggle" for activation—the premise of "toggle" being requisite for devices subject to space limitations. In this embodiment, a QWERTY keyboard 1501 is displayed. With a QWERTY allocation encompassing nearly the entire touchscreen 10 as shown, despite the diminutive status of each individual key, there is not sufficient room for additional sets of numbers or special characters to be displayed concurrently. The solution to such space constraint is the toggle.

The upper-toggle button 1503 in the third frame 1507, for instance, changes the displayed keys to a "numerical-based set" 1505 (second frame), whilst the lower toggle button 1503 in the same frame reverts back to the QWERTY set. To engage additional punctuation and the special characters set of 1507, the user would simply touch the upper-toggle button 1503 in the second frame 1505; allowing a user to refresh to a new character set in the same, fixed space. Both useful and germane to the small footprint.

The letter "A" 1509 and dash "-" 1511 share a location, or toggle area, on the touchscreen 10. Thus, on the data-entry device, both the "A" and "-" keys are conductively married to the matrix point adjoining this shared area of the touchscreen 10, allowing the data-entry device to be used in similar fashion to a desktop environment in attribute to the present invention. A "toggle" need not exclusively be triggered by contact with a "toggle character" and instead a data-entry device can also contain a "toggle button" or set of "toggle buttons" that cue the respective character sets automatically (conductive-path wiring not shown) when a "toggle button" is touched, then depressed (if, like in a previous embodiment, the key is spring mounted or requires downward pressure to be contactually engaged) or otherwise receives touch input. A receptive keyboard, keypad or data-entry device 60 can be designed to automatically shuttle between toggle sets, when, for instance, a button on the data-entry device is pressed that does not have its corresponding soft key currently displayed on the touchscreen 10. A data-entry device and related processor can, for instance, toggle to an appropriate screen before actuating the intended key stroke via an innate capacitive source and manager according to some operation modes, the reader may refer to FIGS. 9A, 9B for related discussion. The data-entry device may default back to a set of characters such as the QWERTY set or remain static to the character set of the first keystroke entered after a "toggle button" has been initialized and can be completely customizable (setting defaults manually, for instance in an option to customize toggle behavior) in certain incarnations.

In a variant embodiment, a receptive keyboard, keypad or data-entry device 60 comprises a flexible conductive membrane disposed with an arrangement of alphanumeric keys designed for depression by a user. The described data-entry device 60 operably links to a target touchscreen device by any connection means serviceable and permits data-entry to occur at a distance from the touch screen (for example, more naturally at least at an arm's length). Said variant embodiment being fully supported by the teachings of at least parent U.S. Pat. No. 8,368,662.

Amongst a list of functional electronics, the keyboard may contain memory storage, a specially designed matrix attachment with OCR capability, broad wireless functionality, including near-field communications (NFC), for pairing with a user device 5, a miniature LCD with, amongst other means, message storage and draft output capability and, as referenced, a device processor that powers such improved functionality, amongst other possible functionalities divined by those skilled in the art and not detailed here. Such discourse is not intended as a limitation on the breadth and scope of the present invention.

The conductive data-entry attachment and ensemble, like its conductive actionable-object controller counterpart, can leverage the use of both haptic and wireless technologies to empower functionality. Haptic inclusion may prove useful, for example, if a person was to use a keyboard, keypad or data-entry device, in the spirit and scope of this discourse, for game play, such as with a text-based adventure or role-playing game.

For purposes of disclosure, touchscreen based hardware—and references to a hardware's touchscreen—include any and all touchscreen-based technologies within the spirit and scope of this discourse, premised on the ability for adaptation beyond those that are capacitive and capacitance governed. The present invention may, for example, require certain, modifications and engineering protocol to actualize functionality for non-capacitive based touchscreen—such as those with resistive touchscreen technologies that sense contactual pressure differently than a capacitive touchscreen. For instance, a spring-mounted touch element requiring downward pressure to effect point-of-contact with a touchscreen display vs. an operating scenario of perpetual touch-element contact with a touchscreen display may be an underlying modificative transition for resistive touchscreen technologies. For any touchscreen technology that relies on an electric signal to determine, the location of touch, embodiments disclosed herein may function as described without substantial modification and those skilled in the art will appreciate any modificative qualifiers that may be necessary regarding the type of input electrical signal.

For touchscreen technologies relying on physical contact with/pressure change on a touchscreen 10, such as with resistive, surface acoustic wave, infrared, optical imaging, dispersive signal technology and acoustic pulse recognition touchscreens, modification may generally be needed for remote input embodiments (e.g., teleoperation) to convert the conducted electrical signal into a point of pressure on the touchscreen 10. Notwithstanding any disclosed embodiments that can result in a point of pressure being created on a touchscreen 10 and the possibility for trans-interoperability between differing touchscreen technologies that this represents, this can additionally be accomplished, for example, by coupling one or more actuators to the one or more conductive elements 909, 910 (actuator elements) configurable to contact and exert pressure 909 on the touchscreen 10 when an input signal is received. An intermediary-transceiver device could also be readily designed to convert input manipulation into point-of-pressure contact on a touchscreen 10 to cater to demands of those touchscreens. An innate capacitive source and manager could, for non-limiting example, be replaced by a system of mechanical relays of "contactual pistons". Embodiments are disposed to modification and combination.

Although some embodiments are shown to include certain features, the inventor specifically envisions that any feature disclosed herein may be used together or in combination with any other feature on any embodiment of the invention. It is also envisioned that any feature may be specifically excluded from any embodiment of an invention.

While the noted embodiments and accompanying discourse and illustrations of the invention disclosed herein can enable a person skilled in the art (PSITA) to make and use the invention in its detailed exemplary embodiments, a skilled artisan will understand and appreciate the actuality of variations, modifications, combinations, atypical implementations, improvements and equivalents of any of the specific embodiments, methods, illustrations and examples listed herein.

While the present invention has been described with reference to such noted embodiments, methods, illustrations and examples, it is understood by a skilled artisan that the invention is not limited to any of the disclosed embodiments, methods, illustrations and examples, but by all embodiment, methods, illustrations and examples within the spirit and scope of the invention. The scope of the following claims, and the principles and novel features, amongst the discourse herein, is to be accorded the broadest interpretation so as to encompass all modifications, combinations, improvements and equivalent structures and functions.

Any particular terminology describing certain features or aspects of the invention is not suggestive of language restricted to any specific characteristics, features, or aspects of the invention with which that terminology is associated. Furthermore, any reference to claim elements in the singular, for example, using the articles "a," "an," or "the," is not to be construed as limiting the element to the singular.

New Subject Matter Added to the Titled Patent on Dec. 29, 2017

On Dec. 29, 2017 the inventor disclosed a body of new subject matter, as detailed in APPENDIX A.

APPENDIX A

On Dec. 27, 2017 "CBS This Morning" aired a segment corroborating a link between mobile phone use and the risk of developing myopia or nearsightedness. Particularly, in citing new evidence, the airing suggested that mobile device use—an event typically occurring indoors—leads to a marked reduction in time a user spends outdoors and in the presence of sunlight (sunlight educes the beneficial neurotransmitter dopamine). A causative relationship was suggested.

In an effort to at least address this health risk, a new disclosure is being proposed by the inventor in accordance with an embodiment: a points-based reward system, catering, although non-exclusively, to mobile devices. Unlike the more prevalent retail models linked to purchases, the points under this system are generated by the amount of outdoor time and/or physical activity a user participates in and are synced to a user device or user profile for redemption. Particularly, the points system is used to at least grant the user access and duration rights to a device and thereby create an incentive for the user to balance their mobile time (according to the Kaiser Family Foundation, digital device use is 7 hours and 38 minutes a day for those between 8-18 years of age) with outdoor activity and fitness. According to an example, special tokens may be provided for on-line access pertaining to student academics only, although a healthy separation remains the impetus of such program.

To suggest by example, the points can be based on regularly-updated logs by at least one of a parent and teacher. And such a point system may even be built into grade reporting schemes of district school boards that traverse beyond the metrics of basic Physical Education classes to ensure better time balancing principles in an ever-connected world. It may be OS and/or app based and be configured with or without access privileges; particularly if supported by manufacturers (preferred).

In another aspect, inter, intra and extracurricular tie-ins may also be used to at least encourage fill rates, physical participation and to spread adoption of the system. In yet another aspect, local, regional and national leader boards may be established for official events and may include sponsors, prizes and giveaways that can at least encourage physical activity and/or physical activity outdoors.

A further and related disclosure of new subject matter was thereon made by the inventor. Disclosed at present is an on-screen magnification system linked to an eye-tracking camera module. While instances of eye-tracking have been disclosed previously in the mobile field, the present disclosure, more distinctly, relates to a localized magnification technique that is manipulated by eye-behavior characteristics. Particularly, the camera module is used to map coordinates of a user gaze (e.g. in reference to a display screen, what section of the display is currently being viewed?) with an enlarged GUI field-of-view occurring concurrently at the processed gaze locations.

A utility that may prove especially useful in helping prevent user eye strain during web browsing activities, email reading, texting etc., on small display screens. Ideally, the disclosed feature set described is built directly into a smart-device's OS and is linked to at least one of a scroll feature and a text-to-speech option (e.g. for poorly coded webpages leading to an incorrect scrolling function an audio reading may be provided) to further expand the user-friendly interface. Conversely, it may also be app based and available as a free download and/or available for purchase from a trusted source using at least one of a gift card, a device-based purchase credit, a physical currency or a digital currency in an established (e.g. an app/mobile/trade specialty e-store launched or aggregated by a major telco or telcos and supporting all major brands) marketplace.

Smartphones, smartwatches, tablets, wearables, head-mounted displays, personal navigation devices, etceteras, provide for a platform utility. The system may also comprise an AI interface for at least activity modeling and may be pressure-activated in the form of a pop-up engagement from a menu system permitting the feature to be conveniently turned on and/or off in an instant. Not suggestive of limitation.

Yet another disclosure was made by the inventor on Dec. 29, 2017. It describes an adapted display system for light composition comprising at least one of a plurality of magnetically trapped particles and a particle acceleration and/or interaction process. The display system further comprising at least one of one or more electric fields, magnetic fields, electrostatic waves, electromagnetic waves, disturbances, wind events, ionization events and geo fields.

A hindmost disclosure is premised on the teachings of Faraday's law of induction. More particularly, creating and harnessing an Eddy current environment for one or more touch dispositions on a touchscreen device as a basis for a novel input methodology and charging configuration thereof. Using the human finger as a conductor source to facilitate and house the closed loops of electrical current, as induced by a changing magnetic field, for instance, and configuring a harnessing module in the device itself, permits for the creation of an energy-repatriation touch methodology (which will supply at least one of a current and a charge to a linked rechargeable battery). The inventor proposes a specially designed ITO-treated magnetic screen coating and/or a magnetic shell casing of a device to act as the magnetic field and changing magnetic field source; which will occur as it interacts with the one or more finger conductors being dragged across a screen (e.g. during the act of a touch swipe) in rapid fashion. Touch swipes are, of course, a standard touch input mechanic and will occur frequently (and productively) over the course of daily operation. Ergo, adding the potential to extend considerably the operable time period before the battery needs wall recharging.

What I claim is:

1. A controller configuration for controlling one or more soft inputs on a capacitive touchscreen device, comprising:
   i) a controller positioned on a user's body and having at least a portion embedded with a capacitive touch-sensitive surface comprising a grid or lines of conductive threads, used to form conductive paths in a fabric construction or a nano-technology fabric construction, coupled to a sensing circuitry and configured such that it is responsive to manipulation by a touch applied thereto for making one or more control inputs; and
   ii) a transceiver or a wireless intermediary device comprising: a processor; a battery; and/or the sensing circuitry;
   wherein the control inputs are operably coupled with the intermediary device;
   wherein the intermediary device is operably coupled with the touchscreen device;
   wherein upon receiving the made control inputs, the intermediary device: converts the made control inputs to mapping actions effective to control the corresponding soft inputs; and wirelessly outputs to the touchscreen device the mapping actions effective to control the soft inputs, optionally with the help of a mobile app; and
   wherein the conductive threads can thereby control the soft inputs from a distance.

2. The controller configuration of claim 1, comprising one or more of the following:
   the touch-sensitive surface further comprising at least one of one or more: conductive polymers, polyanilines, conductive gels, conductive liquids, conductive wires, conductively coated or conductively treated materials, conductive foams, conductive fabrics having the electrically conductive threads, conductive filaments, conductive fibers, and conductive parts;
   wherein the capacitive touchscreen device comprises a: notebook computer; netbook; monitor; television; smartphone; tablet; or wearable;
   wherein the soft inputs are provided via a user interface;
   wherein the controller is detachably positioned;
   wherein the controller comprises a non-conductive thread portion and the conductive-thread portion;
   wherein the transceiver device includes one or more wireless interfaces;
   wherein the touch includes one or more of: touches; multi-touches; gestures; and multi-gestures;
   wherein the fabric comprises a haptic fabric comprising a haptic actuator configured to provide a haptic feedback to the user in response to the touch inputs;
   one or more force feedback servomechanisms; and
   one or more force feedback actuators.

3. The controller configuration of claim 1, wherein the touch sensitive surface is constructed by forming an array of the conductive threads or strands, or of an insulated or shielded conductive thread, such that it is sensitive to one or more of: a location of a finger by sensing a change in capacitance; a pressure of the finger; a size of the finger; and a movement of the finger.

4. The controller configuration of claim 1, wherein the controller and the transceiver are at least one of: wearable or part of a wearable; part of a wearable fabric comprising the plurality of conductive threads comprised of conductive fibers; portable; and unitary.

5. A control system for actuating soft inputs on a capacitive-touchscreen device, comprising:
   a controller apparatus configured for operable coupling with the soft inputs of the touchscreen device;
   wherein the controller apparatus is configured to dispose one or more non-user inputs to the one or more soft inputs corresponding to a mapping control directive on the controller apparatus;
   wherein the one or more non-user inputs comprise a particular manipulation of the touchscreen device involving at least one of:
   i) a wireless or a transceiver-dependent coupling with the touchscreen device; ii) one or more mechanical applicators having a contact end(s) used for applying at least one of: a capacitive and a pressure touch input to the touchscreen device; and iii) one or more mechanical applicators configured to apply a rotation input to the touchscreen device;
   wherein the manipulation involving at least the capacitive touch input comprises one or more conductive paths from a touchscreen display of the device corresponding to the one or more contact end(s) applied to the display and a capacitance change in the display; and
   wherein the particular manipulation of the touchscreen device results in the actuation of the corresponding soft inputs according to the mapping control directive.

6. The control system of claim 5, wherein a servomechanism comprising an actuator or plurality thereof is used to control the respective manipulations made by the applicators, including for at least one of: the touch input corresponding to a single touch or a multi-touch; the rotation; and a positioning or a repositioning of the device, as programmed.

7. The control system of claim 5, wherein at least one of:
   the controller is a form of mapping device; and
   the servo actuator is configured to manipulate the conductive contact end(s) on the apparatus' one or more mechanical applicators to make the applied touches on at least one of: i) one or more soft inputs actuable or being displayed on the touchscreen; ii) one or more surfaces on the touchscreen device in order to perform specific inputs thereon; and (iii) one or more non-screen buttons.

8. A base for a game piece, comprising:
   a contact surface for contacting a touchscreen of a mobile device and comprising one or more conductive touch elements configured to engage the touchscreen;
   wherein the contact surface of the base includes a conductive path extending through the contact surface such that the base serves to capacitively couple a user's hand, holding the game piece, with the touchscreen upon the engagement by the user's hand, specifically as the touch elements are held contacting the touchscreen;
   wherein an arrangement of the touch elements is thus detected by the touchscreen using the conductive path; and
   wherein the arrangement of the touch elements permits the mobile device to sense the game piece being used.

9. The game piece of claim 8, further comprising at least one of:
   the contact occurring on the touchscreen by the contact surface of the base is part of a sequence of inputs during the course of game play, the sequence requiring a repeated deapplication and reapplication of the base from/to the touchscreen according to the game play;

the game piece assuming a shape or physical configuration of at least one of: one or more graphical renderings, members and subjects of the game being displayed;

the game piece comprising a play object;

the arrangement comprising a physical pattern of the conductive elements' touch points and the physical pattern being linked to a particular game function;

at least a second game piece controller comprising a different detectable pattern of conductive elements' touch points is used;

the at least second game piece coming in contact with the touchscreen during one or more parts of the game play;

varying sizes, shapes, configurations, dimensions and features between each of the game pieces;

a nano-technology interface;

a radio interface;

a haptic radar interface; and a haptic teleoperation interface.

10. The game piece of claim 8, further configured to provide haptic feedback in response to the engagement made thereby.

11. The game piece of claim 8, utilizing RFID technology to interact with the game play.

12. The game piece of claim 8, utilizing NFC technology to interact with the game play.

13. A control system for controlling a user interface on a capacitive touchscreen device, comprising:

a transceiver device(s) is operably coupled to one or more user made inputs;

the transceiver device is operably coupled to the touchscreen device;

wherein each of the operable couplings occur wirelessly;

wherein upon receiving the one or more user made inputs, the transceiver device is configured to: convert the one or more user made inputs to mapping actions effective to control the user interface of the touchscreen device; and output, over the wireless link with the touchscreen device, the mapping actions effective to control the user interface;

wherein the user interface comprises an internet-based and/or a mobile-app-based graphical user interface;

wherein the transceiver device is positioned at a first distance from the touchscreen device; and wherein the user interface is controlled by the user inputs made at a second distance from the touchscreen device; and wherein the transceiver device is further configured such that one or more of its transceiver device functions are controllable by a teleoperation device comprising: a tablet, smartphone or mobile device and teleoperation app.

14. The control system of claim 13, wherein the one or more user made inputs comprise:

one or more controllers having a touch-sensitive surface comprising a manipulable conductive material configured to respond to touch using a coupled sensing circuitry and used for controlling the user interface at the second distance from the touchscreen device.

15. The control system of claim 13, wherein the one or more user made inputs comprise at least one of any of the following:

conductive modalities, non-conductive modalities, nano-conductive modalities, nano-technology modalities, RFID modalities, NFC modalities, wave modalities, microwave modalities, radio modalities, radar modalities, infrared modalities, acoustic signals, acoustic inputs, kiosk-type inputs and outputs, respectively; vibration modalities, vibration-couplings, haptic modalities, pressure-based inputs, buttons, and serviceably interrupted conductive paths.

16. The control system of claim 13, wherein at least one of: the one or more user made inputs are communicatively coupled to the transceiver device; the user made inputs are separately used to control a game; the transceiver device is portable; the transceiver device is configured to receive sensory inputs comprising an acoustic input and/or to provide acoustic sensory output to the user; the transceiver device is configured to manage and process Internet-based information-kiosk-type inputs and media control inputs for output to the user; a mobile device processor is wirelessly linked to the transceiver device; the user interface includes app-based control; and the user interface includes at least soft-touch controls comprising one or more of: functions of an/or the app, buttons, keys, icons or other graphical-representation control elements.

17. The control system of claim 13, wherein the transceiver device is an intermediary device configured to: receive data from the user making the input(s); and, using the radio/wireless communication interface, process and output respective data to the user via one or more available user interfaces.

18. The control system of claim 13, wherein the transceiver device is configured to obtain the Internet access and further configured to control an Internet-based information-kiosk-type function enabling a method of providing an information response to the user requesting information, the method comprising:

receiving a command from the user of the transceiver device;

analyzing the command;

generating, based on the analyzed command and information obtained from an internet source comprising the Internet access and the Internet-based information-kiosk-type function, the information response corresponding to the command; and outputting the information response to the user corresponding to the command.

19. A portable smart control device, comprising:

a capability of the smart control device for performing an Internet-based information-kiosk-type function(s);

a housing;

one or more of: a keypad or plurality of keys configured to receive tactile input; an input interface configured to receive acoustic input; and a touch-sensitive surface that is integrated into the housing of the device and configured to receive gesture input;

one or more communication interfaces comprising a wireless transceiver configured to communicate over a wireless link shared with one or more electronic devices at least including either one or both of a portable touchscreen device and a stationary touchscreen device, a processor configured to: convert the gesture input, the acoustic input, or the tactile input to mapping actions effective to control a user interface of the one or more electronic devices; and output, over the wireless link, the mapping actions effective to control the user interface of the one or more electronic devices; and the smart control device is further configured such that one or more of its functions are controllable via teleoperation comprising a tablet, smartphone or mobile device app(s).

20. The smart control device of claim 19, further configured to enable a method of providing an information response to a user requesting information, the method comprising:
- receiving a command from the user of the smart control device;
- analyzing the command;
- generating, based on the analyzed command and information obtained from an internet source based on the capability, the information response corresponding to the command; and
- outputting the information response to the user corresponding to the command.

21. The smart control device of claim 20, wherein: the command is detected as the acoustic input of acoustic signals, and in addition to receiving the acoustic input signals from the command, the smart control device is further configured to output acoustic signals, or for providing sensory output to the user, namely for the outputting of the information response to the user for user consumption.

22. The smart control device of claim 21, wherein the smart device is further configured to at least one of: play games upon receiving the acoustic input command(s) from the user; execute one or more media content applications to play media content as audio, music, video, or multimedia upon receiving the acoustic input command(s) from the user; and operably couple to at least one additional smart device.

23. A control system comprising:
- a touch-sensitive surface wiredly, or the like, or wirelessly connected to a transceiver unit, which may be connected to Internet;
- the touch-sensitive surface comprising a conductive material coupled to a sensing circuitry and placeable in a non-metallic or non-conductive surface, or in a material of choice;
- the sensing circuitry configured to detect touch inputs by sensing a change in capacitance caused by a user's touch applied to the surface of the conductive material;
- a processor of the transceiver unit configured to: convert the touch inputs to mapping actions effective to control a touchscreen electronic device and/or connected device; and output, over a wired or wireless link, the mapping actions effective to control the touchscreen electronic device and/or connected device;
- the system being further capable of receiving, via an app-based engagement, a mappable teleoperation effective to wirelessly control at least one of: the transceiver unit; one or more functions of the transceiver unit; and any paired device in the system; and
- the conductive material comprising at least one of: a haptic material; a manufactured material; a fabric; a wearable fabric having an array of at least conductive threads coupled to the sensing circuitry; a wearable fabric used to provide the user input to input-driven software being executed on the touchscreen electronic device; a non-traditional touch-sensitive surface; wireless connectivity; a wearable technology; and a finger pressure sensor.

\* \* \* \* \*